United States Patent
Sugama et al.

[11] Patent Number: 6,160,195
[45] Date of Patent: Dec. 12, 2000

[54] USE OF REAGENTS TO CONVERT CHRYSOTILE AND AMOSITE ASBESTOS USED AS INSULATION OR PROTECTION FOR METAL SURFACES

[75] Inventors: Toshifumi Sugama, Wading River; Leon Petrakis, Port Jefferson, both of N.Y.

[73] Assignee: Brookhaven Science Associates, Upton, N.Y.

[21] Appl. No.: 09/235,195

[22] Filed: Jan. 22, 1999

[51] Int. Cl.[7] .............................. A62D 3/00; B09B 3/00; C09K 13/08; C01F 11/12

[52] U.S. Cl. ....................... 588/242; 216/99; 216/109; 588/254; 588/901; 423/167.1; 423/335; 423/659; 252/79.3

[58] Field of Search ................... 588/242, 254, 588/901; 423/167.1, 335, 659; 252/79.3; 216/99, 109

[56] References Cited

U.S. PATENT DOCUMENTS

| | | |
|---|---|---|
| 3,338,667 | 8/1967 | Pundsack . |
| 3,708,014 | 1/1973 | Wally . |
| 3,721,637 | 3/1973 | Schultz et al. . |
| 3,773,465 | 11/1973 | Keeney et al. . |
| 4,174,269 | 11/1979 | Carlin et al. . |
| 4,289,736 | 9/1981 | Lalancette ................ 423/158 |
| 4,818,143 | 4/1989 | Chou .................... 405/128 |
| 4,978,516 | 12/1990 | Yamada et al. ............ 423/331 |
| 5,041,277 | 8/1991 | Mirick ................... 423/659 |
| 5,258,131 | 11/1993 | Mirick et al. ............ 423/167.1 |
| 5,258,562 | 11/1993 | Mirick et al. ............ 588/242 |
| 5,264,655 | 11/1993 | Mirick et al. ............ 588/242 |
| 5,317,056 | 5/1994 | Batdorf .................. 524/556 |
| 5,516,973 | 5/1996 | Mirick et al. ............ 588/242 |
| 5,543,120 | 8/1996 | Selby ................... 423/167.1 |
| 5,741,358 | 4/1998 | Hartman ................. 588/242 |
| 5,743,841 | 4/1998 | Block et al. ............ 588/901 |
| 5,753,031 | 5/1998 | Block ................... 588/901 |
| 5,753,032 | 5/1998 | Block ................... 588/901 |
| 5,753,033 | 5/1998 | Block ................... 588/901 |
| 5,753,034 | 5/1998 | Block ................... 588/901 |
| 5,753,035 | 5/1998 | Block ................... 588/901 |
| 5,763,738 | 6/1998 | Sugama et al. ........... 588/236 |
| 6,005,158 | 12/1999 | Sugama et al. ........... 588/236 |

FOREIGN PATENT DOCUMENTS

| | | |
|---|---|---|
| 975-738 | 11/1982 | U.S.S.R. . |
| WO 88/10234 | 12/1988 | WIPO . |

OTHER PUBLICATIONS

T. Sugama, R. Sabatini and L. Petrakis, "Decomposition of Chrysotile Asbestos by Fluorosulfonic Acid," Ind. Eng. Chem. Res., vol. 37, No. 1, 1998.

*Primary Examiner*—Gary P. Straub
*Attorney, Agent, or Firm*—Margaret C. Bogosian

[57] ABSTRACT

A composition for converting asbestos-containing material, covering metal pipes or other metal surfaces, to non-regulated, environmentally benign-materials, and inhibiting the corrosion of the metal pipes or other metal surfaces. The composition comprises a combination of at least two multiple-functional group reagents, in which each reagent includes a Fluro acid component and a corrosion inhibiting compoment. A method for converting asbestos-containing material, covering metal pipes or other metal surfaces, to non-regulated, environmentally benign-materials, and inhibiting the corrosion of the metal pipes or other metal surfaces is also provided.

18 Claims, 12 Drawing Sheets

Decomposition pathway of chrysotile fiber by FP(O)(OH)$_2$ solution.

Decomposition pathway of chrysotile fiber by FP(O)(OH)$_2$ solution.

+ HF

Silicate Tetrahedron $R^{2+}O_6$ and $R^{3+}O_6$ Octahedron
(Where R is Mg, Fe, and Mn)

+ $H_3PO_4$ $H_2SiF_6$

Quartz $MgHPO_4$

Decomposition model of $FP(O)(OH)_2$- treated amosite fiber.

Comparison between enthalpy values of exothermic energy generated from 1.5 M $FP(O)(OH)_2$-, HF-, and $H_3PO_4$-treated chrysotile and amosite.

Changes in ΔH of 1.5, 2.0, and 3.0 M $FP(O)(OH)_2$ - treated amosite samples as a function of time.

FT-IR spectra for the untreated, and 1.5 M $H_3PO_4$-, 1.5 M HF-, 1.5 M $FP(O)(OH)_2$- and 2.0 M $FP(O)(OH)_2$- treated chrysotile fibers.

XRD patterns of chrysotile (a), 1.5 M $H_3PO_4$- (b), 1.5 M HF- (c), and 1.5 M $FP(O)(OH)_2$- treated chrysotile (d).

FT-IR spectra for untreated, and 1.5 M $H_3PO_4$-, 1.5 M HF-, 1.5 M $FP(O)(OH)_2$-, and 2.0 M $FP(O)(OH)_2$ - treated amosite fibers.

XRD tracings of untreated (a), and 1.5 M $H_3PO_4$- (b), 1.5 M HF- (c), and 1.5 M $FP(O)(OH)_2$- treated amosite fibers (d).

XPS $MG_{2p}$ and $Si_{2p}$ core-level spectra for untreated, and 1.5 M $H_3PO_4$-, 1.5 M HF-, and 1.5 M $FP(O)(OH)_2$- treated chrysotile fiber's surfaces $P_{2p}$ and $F_{1s}$ regions of $H_3PO_4$-, HF- and $FP(O)(OH)_2$- treated chrysotile fiber's surfaces.

Mg$_{2p}$, Si$_{2p}$, P$_{2p}$ regions for untreated, and 1.5 M H$_3$PO$_4$ -, 1.5 M HF-, and 1.5 M FP(O)(OH)$_2$- treated amosite fiber's surfaces.

$F_{1s}$, $Fe_{2p3/2}$, and $Mn_{2p3/2}$ core-level spectra for untreated, and 1.5 M $H_3PO_4$-, 1.5 M HF-, and 1.5 M FP(O)(OH)$_2$- treated amosite surfaces.

USE OF REAGENTS TO CONVERT CHRYSOTILE AND AMOSITE ASBESTOS USED AS INSULATION OR PROTECTION FOR METAL SURFACES

This invention was made with Government support under contract number DE-AC02-76CH00016, awarded by the U.S. Department of Energy. The Government has certain rights in the invention.

BACKGROUND OF THE INVENTION

The present invention relates to compositions and methods for converting chrysotile and/or amosite asbestos-containing matrices, such as thermal insulation materials, found on pipes or other metal surfaces, to non-regulated environment benign materials and for preventing the corrosion of the pipes or other metal surfaces.

Asbestos is a commercial term applied to a group of silicate minerals which occur in fibrous form. There are six principal asbestos minerals. Of these six minerals, only one, chrysotile asbestos, belongs to the group classified as serpentine asbestos, that is, minerals characterized by long fibers which are serpentine in shape. The chemical composition of chrysotile asbestos may be represented as: $Mg_3(Si_2O_5)(OH)_4$ or $3MgO \cdot 2SiO_2 \cdot H_2O$. The crystalline structure of chrysotile asbestos consists of alternating layers of silica and magnesium oxide/hydroxide bound to each other through covalently shared oxygen. These layers are transverse to the fiber axis.

The other varieties of asbestos are typically silicates of magnesium, manganese, iron, calcium and sodium. These varieties of asbestos belong to the amphibole (straight fiber) group of minerals. The amphibole's fundamental unit is a chain of $SiO_4$ tetrahedra linked by corner oxygen atoms, and the chains are linked laterally by cations, such as Mg, Mn, and Fe. Grunerite asbestos, more commonly referred to as amosite, is one of the most readily available and commercially used varieties of the amphibole group of minerals. The chemical composition of amosite asbestos may be represented as: $Fe_7 Si_8 O_{22} (OH)_2$.

Although about 90% of the world production is the chrysotile form of asbestos, amosite is widely used in high-temperature insulation, acid-resistant products and asbestos cement. Particularly, amosite is used as high-temperature insulation around iron and other metal pipes and surfaces. Iron may include iron alloys such as alloys with cobalt, nickel, chromium, manganese, carbon, including steel and stainless steel. Other metals used in .pipes may include copper, aluminum, brass, zinc or any other commonly used metal for piping or building construction.

For a number of years now it has been recognized that many chronic diseases are associated with the inhalation of airborne asbestos fibers, including both chrysotile and amosite asbestos. These diseases include lung cancer, chronic fibrosis of the lung lining, and mesothelioma, a rare but fatal cancer of the lungs.

Government agencies have passed regulations banning the use of products containing either chrysotile or amosite asbestos in building construction. However, asbestos-containing materials are still present in many structures built before the regulations went into effect and remain a potential health threat. Building owners have used various methods to address the dangers posed by asbestos and to ensure that asbestos fibers do not enter occupied space. One temporary and relatively inexpensive method is encapsulation, where the asbestos-containing materials are sprayed with a surface-coating material to seal-in the asbestos. This method, however, provides only a temporary remedy since the asbestos fibers are only isolated by the encapsulation. Moreover, merely encapsulating asbestos covered pipes will not prevent exposure when a pipe bursts or the integrity of the encapsulation is otherwise compromised.

Thus, another method employed by building owners is the complete removal of all chrysotile and/or amosite asbestos-containing materials. The drawback to this method is that it involves a significant amount of time and expense because a building must be sealed off, the asbestos-containing materials removed (usually by hand to minimize the dust), and once removed, the asbestos-containing materials must be disposed. In addition, many safeguards must be employed to prevent inhalation of airborne asbestos by workers and others in the vicinity of the working area and government regulations often require the continuous monitoring of the air while the work is being done. Furthermore, because of the hazardous nature of the asbestos-containing material that is removed, the disposal is very costly.

A number of methods have been proposed for rendering asbestos-containing material less harmful. U.S. Pat. Nos. 5,041,277 and 5,258,562, both to Mirick, and U.S. Pat. No. 5,264,655 to Mirick, et al. are directed to methods and products for converting asbestos to a non-asbestos material. The method disclosed in the '277 patent requires wetting the asbestos-containing materials with weak organic acids and subsequently rewetting the asbestos-containing materials with additional weak organic acids. This method, although substantially effective, is not efficient in time and cost because it requires successive wetting of asbestos-containing materials.

The methods of the '562 patent and the '655 patent require wetting asbestos-containing material with an aqueous solution consisting of weak organic acid, such as trifluoroacetic acid, and optionally fluoride ions. The methods of the Mirick and Mirick, et al. patents contemplate soaking the asbestos-containing material when possible or spraying the asbestos-containing material when the methods must be employed in situ. Although the methods of the Mirick and Mirick et al. patents may be effective, they are not efficient in cost and time, especially when the in situ spraying method is used, because the disclosed technology requires the conversion process to be repeated as frequently as possible so that the asbestos-containing materials are subjected to successive spraying with acid solution.

As amosite asbestos is used mainly in high-temperature insulation, acid-resistant products and asbestos cement, it has been widely used to insulate pipes, furnaces, boilers and other metal surfaces, which generally require an in situ treatment. Consequently, any in situ method for chemically converting the amosite asbestos to environmentally benign materials must take into account the effect of the chemicals on the metal pipes, boilers and other metal surfaces. Many of the known asbestos treatment methods use acids, such as sulfuric, hydrochloric, nitric, phosphoric, formic, acetic or other weak organic acids, alone or sometimes in combination with metal or acidic salts. Moreover, these known methods often call for treatment at elevated temperatures. While these known methods may be effective in treating asbestos, the conditions under which they are used will likely cause rapid corrosion of most commonly used metals found in building construction, especially iron and carbon steel. Thus, there is a need for a chemical reagent that converts the asbestos-containing materials to non-regulated environmentally benign materials and also inhibits the corrosion of the pipes and other metal structures that are covered by the asbestos insulation.

SUMMARY OF THE INVENTION

The present invention, which addresses the needs of the prior art, provides a composition and method for converting asbestos-containing, materials, and more particularly amosite asbestos-containing materials, covering metal pipes or other metal surfaces, to non-regulated environmentally benign-materials and inhibiting the corrosion of pipes and other metal structures that are covered by the asbestos-containing material. The composition of the present invention is a reagent system which includes a fluoro acid component capable of converting or digesting the asbestos-containing material and a corrosion inhibiting component capable of inhibiting corrosion to the metal pipes or surfaces covered by the asbestos-containing material. The "fluoro acid" component may include any source of fluorine ($F^-$) ions in the presence of a source of hydrogen ($H^+$) ions. Preferably, the fluoro acid component will be a super acid containing a hydrofluoric acid functional group. The corrosion inhibiting component includes a reagent containing a functional group capable of inhibiting corrosion to a metal surface when present with the fluoro acid component. Preferably, the corrosion inhibiting functional group is a phosphate, aliphatic amine, aromatic amine, or a poly aromatic amine.

The composition may be a mixture of a reagent which contains a fluoro acid component and a reagent which contains a corrosion inhibiting component. The composition is preferably a single reagent, which contains both components, such as fluorophosphoric acid, triethylamine tris (hydrogen fluoride), hydrogen fluoride-pyridine and poly [4-vinyl pyridinium poly (hydrogen fluoride)]. Whenever such a single reagent is used, its concentration is preferably from about 0.5M to about 6.0M.

The composition is more preferably a combination of different reagents, in which each reagent in the combination contains both a tluoro acid component and a corrosion inhibiting component. These combinations may be from about 0.5M to about 3.0M fluorophosphoric acid and from about 0.5M to about 2.0M triethylamine tris (hydrogen fluoride); from about 0.5M to about 3.0M fluorophosphoric acid and from about 0.5M to about 2.0M hydrogen fluoride-pyridine; and from about 0.5 to about 3.0M fluorophosphoric acid and from about 0.5M to about 2.0M poly [4-vinyl pyridinium poly (hydrogen fluoride)].

The non-regulated environmentally benign-materials which are formed by the flouro acid component of the composition of the present invention include silica, silica gel and quartz. Typically, chrysotile type asbestos will be converted to silica or silica gel and amosite type asbestos may be converted to either silica gel or quartz. The type and concentration of the converting reagent will generally affect the percentage of amosite converted to quartz or silica.

The composition can be applied by spraying the asbestos-containing material, which covers the pipe or other metal surface, or by immersing it in the composition, where possible.

As a result of the present invention, a composition and method for converting asbestos-containing materials covering metal pipes and surfaces and inhibiting the corrosion of the metal pipes and surfaces is provided which can convert amosite-containing thermal insulation or chrysotile-containing fire-proof material to non-regulated environmentally benign materials without corroding the metal pipes or surfaces. The asbestos-containing material may be either chrysotile or amosite containing, or it may be a mixture of both, chrysotile and amosite-containing asbestos. However, the present invention is particularly useful in converting amosite, because of its wide use as a thermal insulator for metal piping and furnaces.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

The present invention provides a composition and methods for converting asbestos-containing materials covering metal pipes or other metal surfaces to environmentally benign, non-regulated components, and inhibiting the corrosion of the metal pipes and surfaces.

Non-regulated, environmentally benign components refers to components which are formed after asbestos-containing materials have been morphologically altered to reduce or nullify its hazardous effect on mammals.

Asbestos containing materials include materials including either chrysotile-bearing and/or amosite-bearing materials. For example, fire proofing is a chrysotile bearing material which also includes gypsum and vermiculite. Thermal insulation is an example of amosite fiber bearing material which also includes cement and mineral fillers.

By nature chrysotile asbestos is a serpentine silicate mineral. Each chrysotile asbestos fiber is a long hollow tube. The diameters of the individual tubes are 20 to 50 nm. The length-to-diameter ratio can vary from 20:1 to well over 10,000:1. The chemical composition of chrysotile asbestos can be represented as $Mg_3(Si_2O_5)(OH)_4$ or $3MgO\ 2SiO_2\ H_2O$.

Figure 1:
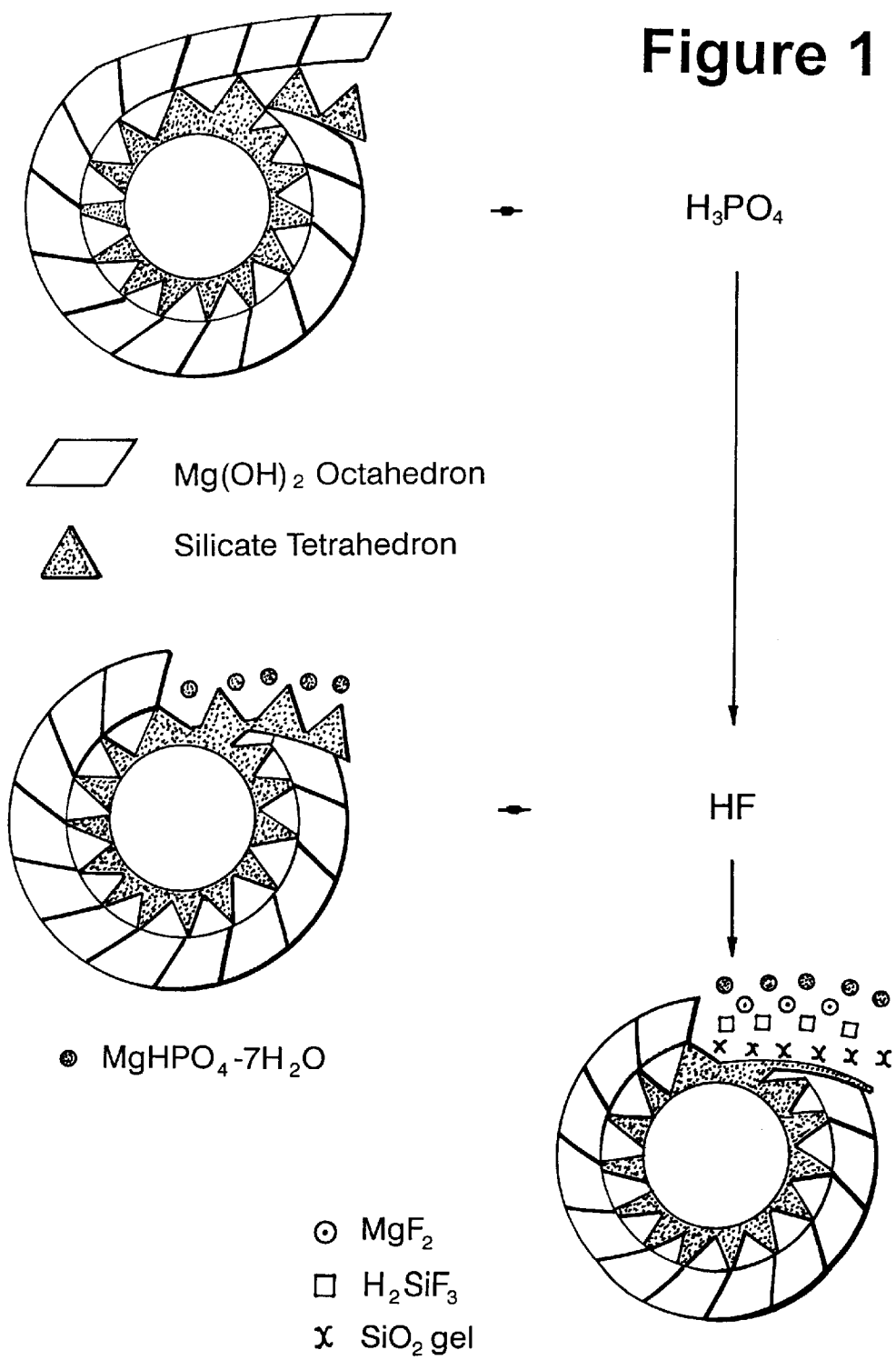
FIG. 1 illustrates a decomposition pathway of chrysotile fiber by $FP(O)(OH)_2$ solution.

The crystalline structure of chrysotile asbestos consists of alternating layers of silicate, magnesium oxide, and magnesium hydroxide bound to each other through covalently shared oxygen molecules. These layers are transverse to the fiber axis and appear to form a tubular scroll-like structure. More specifically, chrysotile asbestos can be characterized as a hollow cylindrical tube with the external surface formed by the magnesium hydroxide layer, and with the internal surface formed by the silicate layer as shown in FIG. 1.

When the morphology of chrysotile asbestos is altered by becoming non-regulated or "unrolled" or "uncoiled" the hazardous nature of chrysotile asbestos ceases. Thus, the non-regulated chrysotile asbestos is environmentally benign.

When chrysotile asbestos is exposed to acids, leaching and lixiviating of the magnesium from chrysotile asbestos occur as a result of the interaction between the hydroxyl groups in the magnesium hydroxide layer and the hydrogen ions liberated from the acids. Consequently, the magnesium hydroxide layer is eliminated. The exposure of the chrysotile asbestos to acid results in the conversion of the silicate layer into its various components. More specifically, the acid breaks the Si-OH linkages of the silicate tetrahedron of chrysotile asbestos.

As a result of the above reactions, the tubular scroll-like structure of chrysotile asbestos is converted into an open and unrolled one. Hence, the chrysotile asbestos is converted to a non-regulated environmentally benign component.

Figure 2:
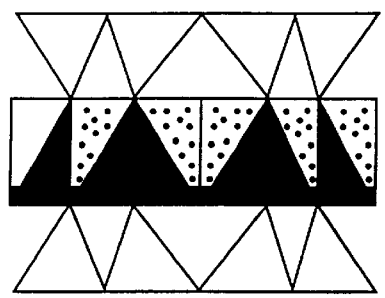
FIG. 2 shows a decomposition model of $FP(O)(OH)_2$-treated amosite fiber.
Figure 2:
Figure 2:
Figure 2:
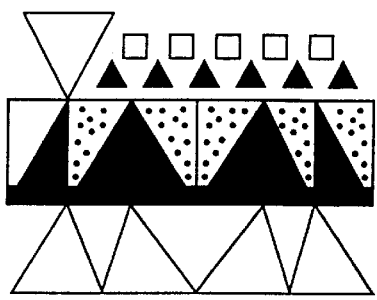
Figure 2:
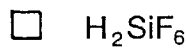
Figure 2:
Figure 2:
Figure 2:
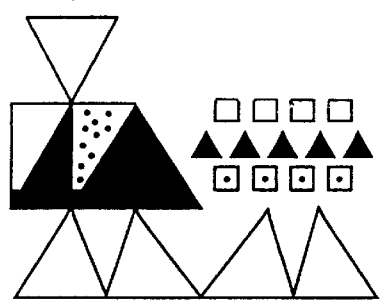

Other varieties of asbestos are silicates of magnesium, maganese, iron, calcium, and sodium. These varieties of asbestos belong to the amphibole (straight fiber) group of minerals. The structure of amosite consists of double-silicate tetrahedral chains which sandwich a layer of edge shared $R^{2+}O_6$ and $R^{3+}O_6$ octahedra, where R is Mg, Fe and Mn. A typical composition of amosite asbestos can be represented as: $Fe_2Si_8O_{22}(OH)_2$. The structure of amosite as well as a mechanism for its decomposition by $FP(O)(OH)_2$ is illustrated in FIG. 2.

Many building products, such as thermal insulation or fire-proofing could incorporate only one type of asbestos, and more frequently mixtures of one or more asbestos minerals. For example, thermal insulation used in furnaces and power plant pipes could contain amosite from about 35% by weight to about 60% by weight with the reminder consisting of filler material such as gypsum, vermiculite, and/or other inert minerals. A preferred range for asbestos content of fire proofing insulation such as that used for fire doors is from about 2% to about 45% by weight asbestos of which about 30% by weight is amosite, about 15% by weight is chrysotile with the remainder being filler materials. The ranges for asbestos content are quite wide and could vary from 2% to 3% by weight up to 60% to 70% by weight asbestos.

Thus, the wide use of amosite, and to a lesser extent chrysotile, as thermal and fire proof insulation for metal pipes and other metal surfaces, warrants the use of converting agents that will not corrode the underlying metal. It is, therefore, an object of the present invention to provide a composition and method for converting asbestos-containing materials to non-regulated environmentally benign materials and inhibiting corrosion of the metal surface covered by the asbestos-containing materials.

The composition of the present invention is a reagent system which includes a fluoro acid component capable of converting or digesting the asbestos-containing material and a corrosion inhibiting component capable of inhibiting corrosion of the metal pipes or surfaces covered by the asbestos containing material.

The term "fluoro acid" as used herein is generally intended to include any source of fluorine ($F^-$) ions in the presence of a source of hydrogen ($H^+$) ions. This may include a reagent capable of donating fluoride ions, such as an aqueous solution of a fluoride salt, in the presence of an acid. Preferably, the fluoro acid component will be a superacid reagent system containing a hydrofluoric acid functional group, which may include hydrofluoric acid (HF), hexafluorophosphoric acid ($HPF_6$) or fluorophosphoric acid [$FP(O)(OH)_2$]. Although other acids, such as $H_2SO_4$ or HCl, combined with a source of fluoride ($F^-$) ions, will generally convert both chrysotile and amosite asbestos material given a sufficient time and a sufficient number of applications, the use of superacids discussed herein will allow for much higher conversion rates of the asbestos-containing material. This is especially apparent when trying to convert amosite asbestos.

The corrosion inhibiting component of the present invention includes at least one reagent which contains a source of a corrosion inhibitor, which reduces or eliminates corrosion of the metal surface covered by the asbestos-containing material being treated. The corrosion inhibitors useful herein are inorganic corrosion inhibitors including chromates, nitrates, phosphates, polyphosphates, silicates, borates, and nitrites; and organic corrosion inhibitors including aniline, pyridine, nitrogen or sulfur hetercycles, benzotriazole and butylamine. Also useful as corrosion inhibitors are amine salts with nitrous or chromic acids; amine salts with carbonic, carbamic, acetic and substituted or unsubstituted benzoic acids; organic esters of nitrous, phthalic or carbonic acids; aliphatic amines; cycloaliphatic and aromatic amines; poly-aromatic amines; polymethylene amines; mixtures of nitrites with urea; nitrobenzene; and dicyclohexalamine nitrate. Preferred corrosion inhibitors are phosphates, aliphatic amines, aromatic amines, and poly aromatic amines. More preferred corrosion inhibitors are reagents containing a source of phosphoric acid, triethylamine, pyridine and pyridinium.

The composition of the present invention may be a mixture of a reagent which contains a fluoro acid component and a reagent which contains a corrosion inhibiting component, such as HF and $H_3PO_4$, respectively. The composition is preferably a single reagent, which is a combined fluoro acid and corrosion inhibiting reagent.

A combined fluoro acid and corrosion inhibiting reagent capable of converting or dissociating the asbestos-containing material and inhibiting corrosion of a metal substrate is fluorophosphoric acid [$FP(O)(OH)_2$] as commercially available from Aldrich Co. The present invention contemplates treatment of asbestos-containing materials which are covering a metal surface, with a solution of $FP(O)(OH)_2$ which can be from about 0.5 M to about 6.0 M in strength. Preferably, the $FP(O)(OH)_2$ solution is applied by spraying the asbestos containing material or by immersing the asbestos containing material into the solution of $FP(O)(OH)_2$. Other useful combined reagents, containing both components, contemplated by the present invention are from about 0.5M to about 6.0M triethylamine tris (hydrogen fluoride), from about 0.5M to about 6.0M hydrogen fluoride-pyridine and from about 0.5M to about 6.0M poly [4-vinyl pyridinium poly (hydrogen fluoride)]. Of course, mixtures of these reagents could also be effectively used. More preferably, combinations of these combined reagents are used to obtain efficient conversion of the asbestos-containing material and effectively inhibiting corrosion of a metal substrate. Such combinations include from about 0.5M to about 3.0M FP $(O)(OH)_2$ and from about 0.5M to about 2.0M triethylamine tris (hydrogen fluoride); from about 0.5 to about 3.0M FP $(O)(OH)_2$ and from about 0.5 to about 2.0M hydrogen fluoride-pridine; and from about 0.5M to about 3.0M $FP(O)(OH)_2$ and from about 0.5M to about 2.0M poly [4-vinyl pyridinium poly (hydrogen fluoride)]. Again, mixtures of these combinations could also be effectively used.

The examples set forth below have been set forth below for the purpose of illustration and to describe the best mode of the invention at the present time. The scope of the invention is not to be in any way limited by the examples set forth below.

EXAMPLES

The following examples have been carried out to convert two different asbestos fibers, chrysotile and amosite into non-regulated materials, using fluorophosphoric acid (FPA) [$FP(O)(OH)_2$], and then to examine the corrosive effect on a carbon steel substrate by using reagents of the present invention. These examples include the rate of exothermic reaction, leaching of ionic species from asbestos, identification of reaction products and by-products obtained when chr-ysotile and amosite are decomposed, and studies of the corrosive effect on carbon steel.

Materials

Two asbestos fibers, chrysotile (Quebec Class 9) and amosite, were obtained from LAB Chrysotile Inc., and the U.S. Department of Commerce National Institute of Standard and Technology, respectively. The fluoroacids used for screening were the fluorophosphoric acid [$FP(O)(OH)_2$] and hydrofluoric acid (HF) as supplied by Aldrich Inc. The mineral acid phosphoric acid ($H_3PO_4$), and combined fluoro acid/corrosion inhibitors triethylamine tris (hydrogen fluoride), hydrogen fluoride pyridine and [4-vinyl pyridinium poly (hydrogen fluoride), were also employed as commercially available.

Comparative Example 1

Figure 3:
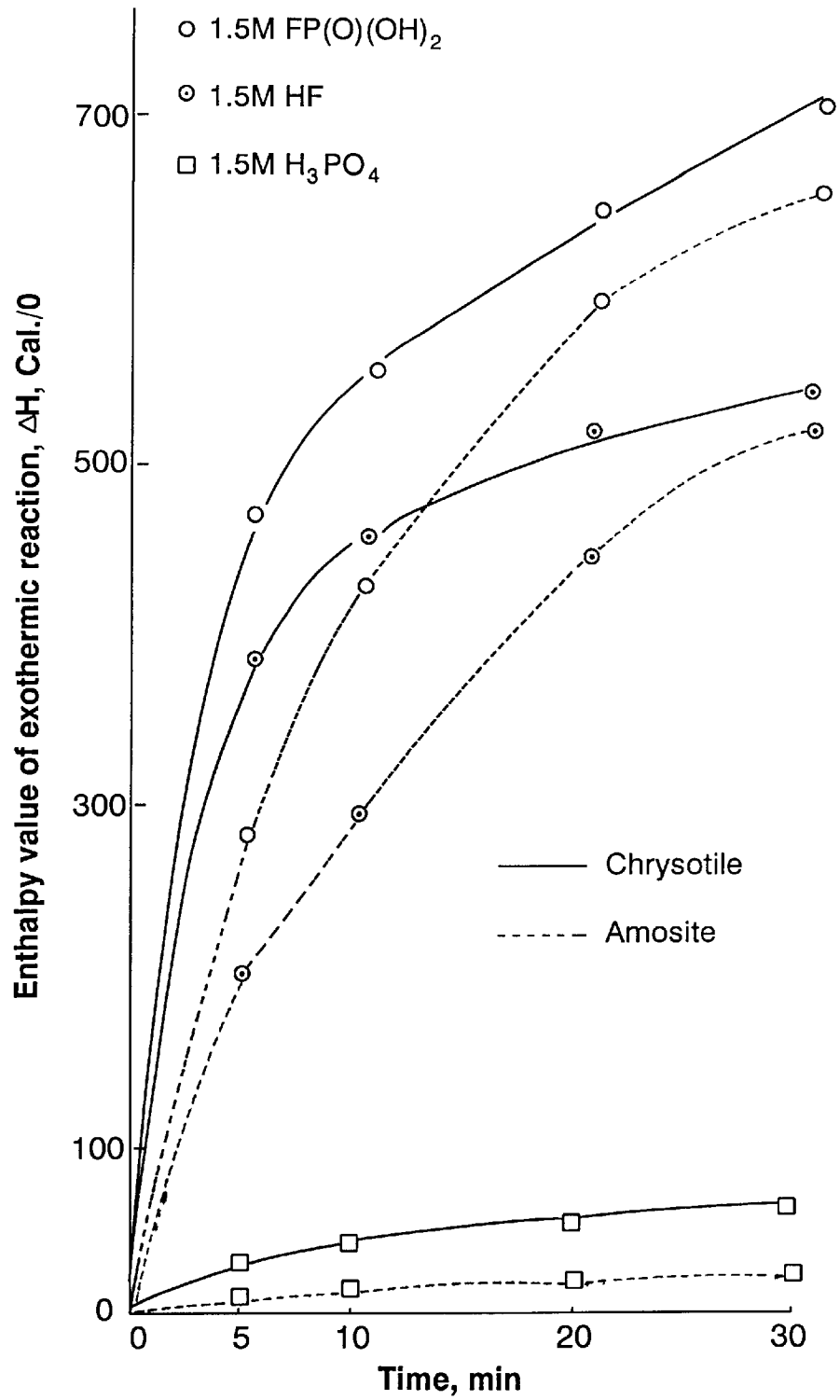
FIG. 3 illustrates a comparison between enthalpy values of exothermic energy generated from chrysotile and amosite samples treated with 1.5 M $FP(O)(OH)_2$, HF, and 1.5 M $H_3PO_4$.

$FP(O)(OH)_2$ was tested for its effectiveness as a reagent for decomposing both chrysotile and amosite asbestos fibers. For comparison purpose with $FP(O)(OH)_2$, two reference reagents, HF and $H_3PO_4$, were used to gain a better understanding of the reaction mechanisms between $FP(O)(OH)_2$ and chrysotile and/or amosite fibers. The pathways of decomposition of asbestos by $FP(O)(OH)_2$ were also investigated. FIG. 3 provides a comparison between $\Delta H$ values generated by 1 gram each of chrysotile and amosite fibers treated with 1.5 M $FP(O)(OH)_2$, 1.5 M HF, and 1.5 M $H_3PO_4$, respectively.

The enthalpy-time graphs shown in FIG. 3 illustrate that the $\Delta H$ values depend on the following three parameters: (1) chemical reagents; (2) species of asbestos; and (3) elapsed reaction time. For the first parameter, $FP(O)(OH)_2$ generated the highest exothermic energy in both chrysotile and/or amosite. Regarding the type of asbestos (parameter 2), amosite was less suscepible to reaction than chrysotile, based upon the lower $\Delta H$ values. In particular, the chemical affinity of amosite for $H_3PO_4$ was extremely poor, as reflected in the $\Delta H$ value of less than approximately 40 cal./g, suggesting that amosite had good resistance to its attack. For $FP(O)(OH)_2$-treated amosite, the values generated in the first 10 minutes were considerably lower than those for $FP(O)(OH)_2$-treated chrysotile samples.

Figure 4:
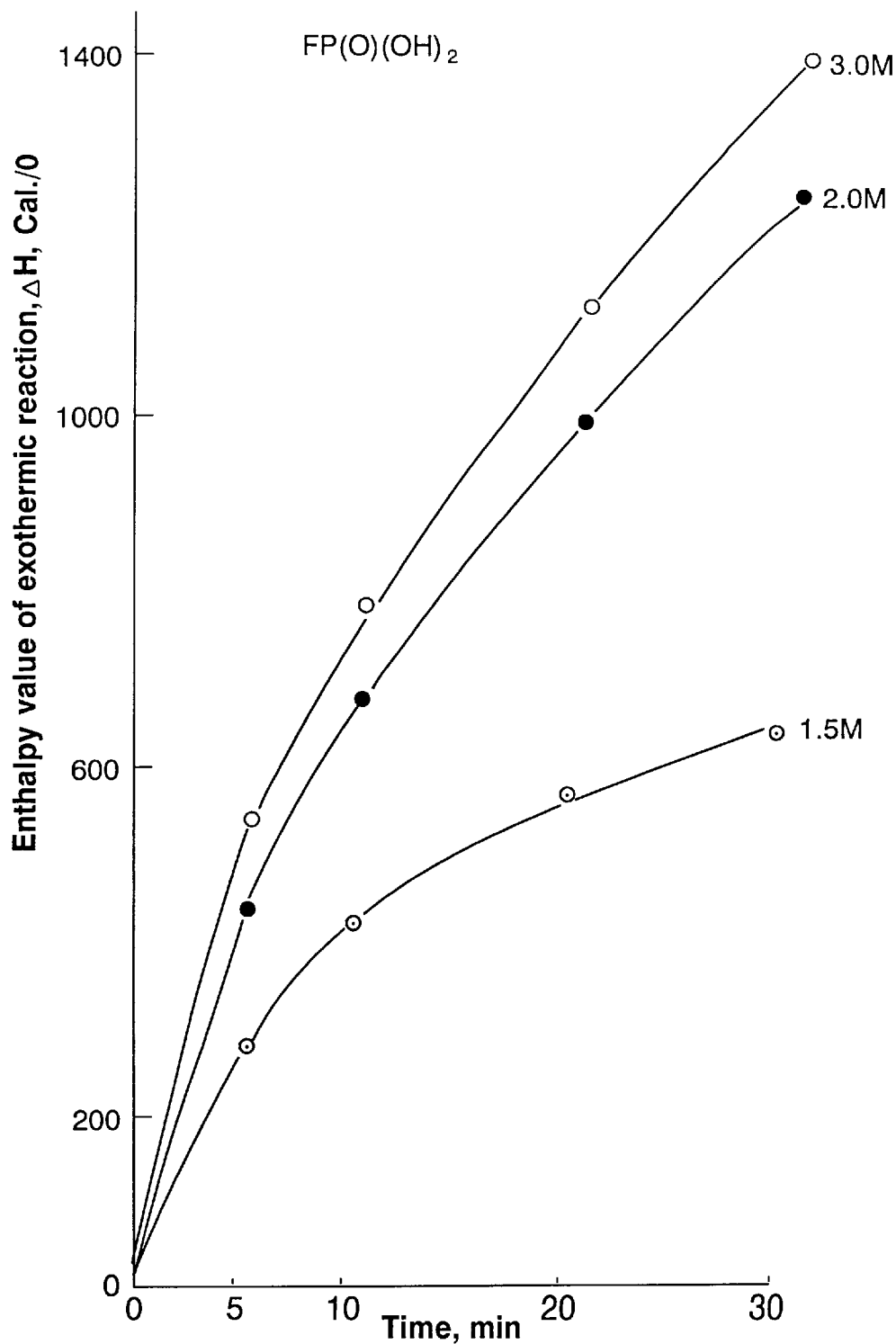
FIG. 4 shows changes in $\Delta H$ of amosite samples treated with 1.5 M, 2.0 M, and 3.0 M $FP(O)(OH)_2$.

FIG. 4 shows the $\Delta H$-time relation of $FP(O)(OH)_2$-treated amosite fibers. As expected, increasing the concentration of $FP(O)(OH)_2$ from 1.5 M to 2.0 M led to high evolution of exothermic energy. A $\Delta H$ in excess of 600 cal./g was attained in a reaction time of only 10 minutes. Approximately 1260 cal./g evolved after 30 minutes, which was twice the amount of the value of $\Delta H$ obtained for the sample treated with 1.5 M-$FP(O)(OH)_2$. This result verified that the extent of reactivity of $FP(O)(OH)_2$ to amosite was dramatically enhanced by increasing its concentration. However, no significant changes in the extent of reactivity was found when amosite was treated with a 3.0 M solution of $FP(O)(OH)_2$. The $\Delta H$ evolved after 30 min was 1430 cal./g, corresponding to an increase of only about 14% over $\Delta H$ obtained for amosite samples treated with 2.0 M. $\Delta H$ values of chrysotile treated with 2.0 and 3.0 M $FP(O)(OH)_2$ were higher than those obtained from amosite samples as shown in FIG. 4.

Example 2
A. Leaching of Ionic Species

To determine the concentration of ionic species, such as Mg, Fe, and Mn cations, and silicate anions leached from chemically treated asbestos, solution samples were prepared as described below. A sample of 0.4 grams of asbestos was placed in a plastic test tube. 14 grams of the chemical reagent was poured into the test tube, followed by soaking for 48 hrs at room temperature, without any physical agitation. Then, the mixture of asbestos and chemical reagent was filtered through a 0.45 $\mu$m millipore filter. The concentration of ionic species present in the filtered solution was measured by atomic absorption spectrometry (AA). Deionized water of pH 6.5 was used as a control solution.

B. Decomposition of Chrysotile Asbestos

The data resulting from the above experiments are summarized in Table 1 below.

TABLE 1

Concentrations of Ionic Species Lixiviated from Chrysotile and Amosite Fibers After Immersing them for 2 days in Deionized Water, and separately in Solutions of 1.5M $H_3PO_4$, 1.5M HF, and 1.5M, 2.0M, and 3.0M $FP(O)(OH)_2$

| Chemical reagent | Asbestos | Lixiviated ions, $\mu$g/ml | | | |
|---|---|---|---|---|---|
| | | Mg | Fe | Mn | Silicate |
| D.I. water | Chrysotile | $4.8 \times 10^{-1}$ | 0.0 | 0.0 | $1.2 \times 10^{-2}$ |
| 1.5M $H_3PO_4$ | Chrysotile | 1.1 | 0.0 | 0.0 | $8.3 \times 10^{-2}$ |
| 1.5M HF | Chrysotile | 3.8 | 0.0 | 0.0 | 7.0 |
| 1.5M $FP(O)(OH)_2$ | Chrysotile | 4.8 | 0.0 | 0.0 | 9.8 |
| 2.0M $FP(O)(OH)_2$ | Chrysotile | 5.7 | 0.0 | 0.0 | $1.1 \times 10$ |
| 3.0M $FP(O)(OH)_2$ | Chrysotile | 5.8 | 0.0 | 0.0 | $1.2 \times 10$ |
| D.I. water | Amosite | $2.2 \times 10^{-3}$ | $1.6 \times 10^{-2}$ | $8.0 \times 10^{-4}$ | $2.0 \times 10^{-2}$ |
| 1.5M $H_3PO_4$ | Amosite | $5.5 \times 10^{-2}$ | $3.8 \times 10^{-1}$ | $2.6 \times 10^{-3}$ | $8.0 \times 10^{-2}$ |
| 1.5M HF | Amosite | $1.2 \times 10^{-1}$ | 1.3 | $1.1 \times 10^{-2}$ | 2.1 |
| 1.5M $FP(O)(OH)_2$ | Amosite | $3.4 \times 10^{-1}$ | 3.2 | $2.5 \times 10^{-2}$ | 3.8 |
| 2.0M $FP(O)(OH)_2$ | Amosite | $5.0 \times 10^{-1}$ | 4.7 | $3.4 \times 10^{-2}$ | 7.5 |

TABLE 1-continued

Concentrations of Ionic Species Lixiviated from Chrysotile and Amosite Fibers After Immersing them for 2 days in Deionized Water, and separately in Solutions of 1.5M $H_3PO_4$, 1.5M HF, and 1.5M, 2.0M, and 3.0M $FP(O)(OH)_2$ Lixiviated ions, µg/ml

| Chemical reagent | Asbestos | Mg | Fe | Mn | Silicate |
|---|---|---|---|---|---|
| 3.0M $FP(O)(OH)_2$ | Amosite | $5.4 \times 10^{-1}$ | 5.0 | $3.8 \times 10^{-2}$ | 7.9 |

Table 1 above illustrates that the principal ions released from the decomposition of chrysotile were Mg and silicate. When chrysotile was immersed into deionized water of neutral pH, the amount of Mg and silicate ions dissociated was $4.8 \times 10^{-1}$ and $1.2 \times 10^{-2}$ µg/ml, respectively. In contrast, a pronounced leaching of Mg was observed from the 1.5 M $H_3PO_4$-treated asbestos; the value of 1.1 µg/ml corresponded to an increase of one order of magnitude above that of the control, but there was no marked leaching of silicate. This information indicated that the external $Mg(OH)_2$ layers of tubular chrysotile structure were vulnerable to strong acid, but there was no significant damage of the inner silicious layers. The acid-inert interweaved silicious layers readily reacted with fluoride ions. Such a fluorinating reaction led to the cleavage of the Si—O—Si linkages within the $SiO_4$ tetrahedra, thereby destroying the fibrous structure of chrysotile. Thus, the 1.5 M HF solution which released two ionic reactants, $H^+$ and $F^-$, not only acted to dissociate a large amount of silicate ions, but also further increased the leaching of Mg ions. The amount of dissociated silicate, 7.0 µg/ml, was an enhancement of two orders of magnitude over that obtained for chrysotile samples treated with 1.5 M $H_3PO_4$.

The following explanation is provided for the abundant release of magnesium and silicate ions from chrysotile. First, the hydrogen ions favorably reacted with the surface hydroxyl groups to promote the hydrolysis of $Mg(OH)_2$ octahedral layers, while the fluoride ions passed through the damaged $Mg(OH)_2$ surface layers and initiated the fluorination reactions with the silica portion of Si—O—Si linkages in the inner silicious layers. The former action lead to the leaching of Mg ions from chrysotile, and the latter one was related directly with the limitation of silicate ions caused by cleavage of Si—O—Si linkages. When a 1.5 M $FP(O)(OH)_2$ solution was used Mg and silicate ions of 4.8 and 9.8 µg/ml, respectively, were leached. These amounts were higher than those leached from HF treated chrysotile. A further increase in leaching of these ions was obtained from chrysotile samples treated with 2.0 M $FP(O)(OH)_2$. However, no significant enhancement in the amount of Mg and silicate ions was found in chrysotile samples treated with 3.0 M $FP(O)(OH)_2$. This finding suggested that the most effective concentration of $FP(O)(OH)_2$ useful to achieve the maximum leaching from chrysotile asbestos is around 2.0 M.

C. Decomposition of Amosite Asbestos

In amosite asbestos, Mg, Fe and Mn are sandwiched between two silicious layers. Therefore, in order to monitor the extent of decomposition of amosite fibers, ionic species of Mg, Fe, Mn and silicate were monitored. Amounts of these ionic species were released from amosite into deionized water as shown in Table 1. The release of ionic species from amosite asbestos immersed into 1.5M $H_3PO_4$ solution increased only slightly over that obtained in deionized water as shown in Table 1. Leaching caused by immersion into $H_3PO_4$ was relatively poor because the amosite structure showed resistance to conversion by $H_3PO_4$. By contrast, pronounced leaching enhanced by approximately two orders of magnitude as compared with leaching in deionized water, was achieved for amosite samples immersed in 1.5 M HF. It is possible that such high leaching behavior was due to the dissociation of superficial silicious layers caused by the fluorinating reaction between F and Si in $SiO_4$ tetrahedra. Correspondingly, this dissociation increasingly promoted the release of cations from the $R^{2+}O_6$ and $R^{3+}O_6$ octahedral layers lying underneath the silicious layers.

A more pronounced leaching of the Mg, Fe and Mn ions, as compared to that obtained with the 1.5M $H_3PO_4$ and 1.5M HF solutions was observed for $FP(O)(OH)_2$-treated amosite samples as shown in Table 1. Increasing the concentration of $FP(O)(OH)_2$ to 2.0 M increased further the release of large amounts of these ions. However, no significant increase in the amount of these ions was found when treating amosite fibers with 3.0 M $FP(O)(OH)_2$ as compared with the amount of ions released by amosite treated with 2.0 M FPA. This finding was similar to that obtained from samples of chrysotile treated with $FP(O)(OH)_2$. The 2.0 M $FP(O)(OH)_2$ solution displayed maximum dissociation of amosite after treatment periods for 2 days.

Example 3

Conversion Products and By-Products

To elucidate comprehensively the reaction mechanisms and decomposition pathways, it is important to identify the conversion products and by-products formed in the exothermic reactions between the asbestos and aqueous solutions of $FP(O)(OH)_2$, HF and $H_3PO_4$, which were less susceptible and nonsusceptible to hydrolysis. The colloidal and solid residues remaining on the filter, after the ion-leaching tests of Example 2, were washed with deionized water to remove any extra chemical adsorbed to the conversion products and non-reacted asbestos. The washed samples were dried for approximately 16 hrs in an oven at 110° C. The dried residues were analyzed to identify the amorphous and crystalline reaction products and by-products of asbestos, and also to estimate the extent of decomposition of asbestos fibers, using fourier transform infrared spectroscopy (FT-IR; Model 1600, Perkin Elmer) and x-ray powder diffraction (XRD; Phillips Electronic Instruments).

For FT-IR analysis, disks were made by mixing 200 mg of KBr and 3 to 4 mg of the asbestos sample that had been ground to a powder by using mortar and pestle. This powder sample was also used for XRD examination. X-ray photoelectron spectroscopy (XPS; CLAM 100, VG Scientific Ltd., Sussex England) was employed to identify the chemical states and atomic fractions of the conversion products at the interfaces between the asbestos fibers and the chemical reagents. The excitation radiation was provided by an Al Kα (1486.6 eV) X-ray source operated at a constant power of 200 W. The vacuum in the analyzer chamber of the instrument was maintained at $10^{-9}$ torr ($\approx 1.33 \times 10^{-7}$ Pa) throughout.

In preparing the XPS samples, the asbestos fibers used as substrate were made into disks, 12 mm in diameter and 0.5 to 1.0 mm thick, prepared by pressing asbestos fibers at 100 Mpa. To precipitate the conversion products on the asbestos disk surfaces, the disks were dipped for a few seconds into chemical reagents. Then, the samples were left in air at room temperature for about 2 hrs, and finally dried for 24 hrs in a vacuum oven at 60° C. The thickness of layers which were explored for superficial interaction by XPS was ≈5 nm, corresponding to the escape depth of an aluminum photoelectron at an electron take-off angle of 38°.

A. Chrysotile Asbestos

Figure 5:
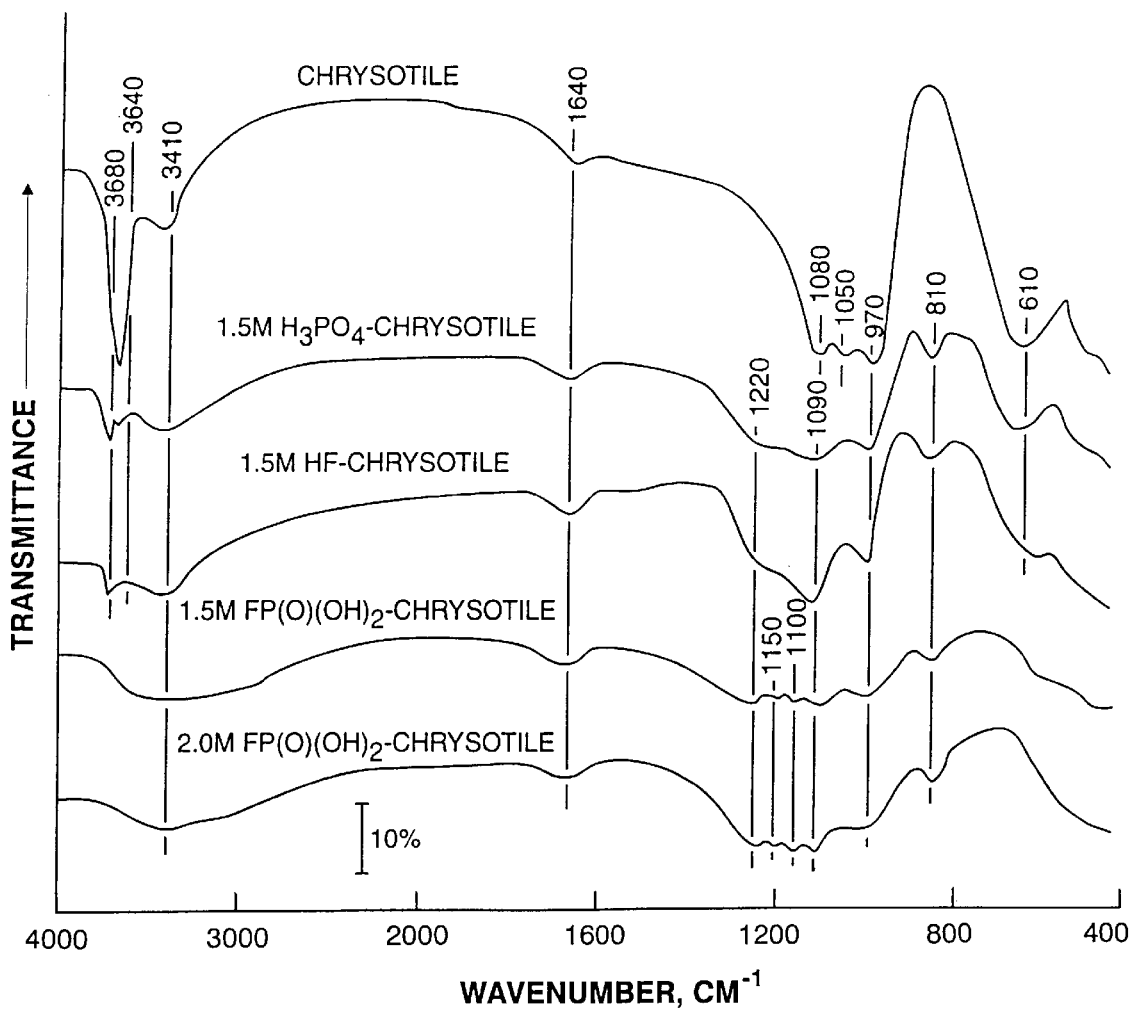
FIG. 5 is an FT-IR spectra for chrysotile fiber samples, untreated, and treated with 1.5 M $H_3PO_4$, 1.5 M HF, 1.5 M $FP(O)(OH)_2$ and 2.0 M $FP(O)(OH)_2$.

FIG. 5 shows FT-IR spectra for untreated chrysotile samples, and chrysotile samples treated with 1.5 M $H_3PO_4$, 1.5 M HF, 1.5 M FP(O)(OH)$_2$ and 2.0 M FP(O)(OH)$_2$ over frequency ranges from 4000 to 400 cm$^{-1}$. As shown in FIG. 5, a typical spectrum of untreated chrysotile included eight absorption bands as follows: a stretching vibration of hydroxyl H—O in magnesium hydroxides [Mg(OH)$_2$] and underlayers at 3680 cm$^{-1}$ peak and 3640 cm$^{-1}$ shoulder; stretching and bending modes of H—O in free or crystal H$_2$O at 3410 and 1640 cm$^{-1}$ peaks, respectively; a Si—O—Si antisymmetric stretching of bridging oxygens within the SiO$_4$ tetrahedra at 1080 cm$^{-1}$, a Si—O—Mg stretching frequency at 1050 cm$^{-1}$; a Si—O stretching mode of non-bridging oxygens at 970 cm$^{-1}$; and, a Mg—O stretching at 610 cm$^{-1}$.

When chrysotile asbestos was treated with 1.5 M $H_3PO_4$, different spectral features from that of untreated chrysotile emerged. The following were observed: (1)$_2$ considerable reduction of peak intensity at 3680 and 3640 cm$^{-1}$, reflecting Mg(OH)$_2$ and an underlayer of SiOH-related OH groups; (2) an appearance of new bands at 1220, 1090, and 810 cm$^{-1}$; (3) a disappearance of 1080 and 1050 cm$^{-1}$ frequencies, relating to the Si—O—Si and Si—O—Mg linkages, respectively; and (4) a decrease in intensity of the nonbridging oxygen Si—O and Mg—O peaks at 970 and 610 cm$^{-1}$, respectively. Also, the spectrum had a broad absorption band in the frequency range from 1220 to 1090 cm$^{-1}$, suggesting other unknown peaks. With respect to the second characteristic the new bands were attributed to the formation of hydrated silica (SiO$_2$) as silica gel.

From the results obtained in connection with different spectral feature (1), (3), and (4), it was concluded that $H_3PO_4$ had a strong affinity for external Mg(OH)$_2$ layers, thereby initiating acid-base reactions with Mg(OH)$_2$. This reaction not only led to the hydrolysis of Mg(OH)$_2$ layers, but also contributed to the breakage of Si—O—Mg and Si—O—Si linkages. The latter phenomenon precipitated the formation of silica gel as a reaction by-product. The formation of silica gel also explained why a large amount of Mg ions and fewer silicate anions leached out from chrysotile. The spectrum of FIG. 5 of chrysotile asbestos treated with 1.5M $H_3PO_4$ also suggested that some unreacted chrysotile fibers remain in the samples because of the presence of chrysotile-related weak absorptions at 3680, 3640, 970, and 610 cm$^{-1}$.

By comparison with the spectrum of $H_3PO_4$-treated chrysotile samples, the spectrum of 1.5 M HF-treated chrysotile fibers disclosed the following four characteristics: (1) a further reduction of peak intensity at 3680 cm$^{-1}$; (2) the elimination of the underlayer SiOH-related band at 3640 cm$^{-1}$; (3) the expression of a strong signal at 1090 cm$^{-1}$ frequency; and (4) the transformation of the peak at 610 cm$^{-1}$ into a shoulder one. These characteristics indicated that chrysotile is quite vulnerable to attack by HF which released two important ionic reactants, acid (H$^+$) and fluoride (F$^-$). The released hydrogen ions are strongly attracted to the surface hydroxyl groups of Mg(OH)$_2$ layers; namely, acid-base reactions between H$^+$ from HF and OH from Mg(OH)$_2$ led to the hydrolysis of the external Mg(OH)$_2$ layers, reflecting characteristics (1) and (4). Although such a chrysotile→silica gel phase conversion was similar to that of the chrysotile samples treated with the $H_3PO_4$ alone, once the outer Mg(OH)$_2$ layers were hydrolyzed, the SiO$_4$ tetrahedra underwent fluorinating reactions caused by the attack of (F$^-$) ions diffusing through the interleaved silicious layers. This reaction further promoted the precipitation of silica gel caused by the cleavages of Si—O—Si and Si—O—Mg linkages, which accounted for characteristics (2) and (3).

Considering that a large amount of silicate anion was lixiviated, the silica gel by-products seemed to be very susceptible to fluorinating-caused dissolution. In other words, the release of surplus (F$^-$) ions from HF reacted with silica gel to promote their further dissolution. This interpretation reasonably accounted for the decomposition pathways of chrysotile by HF by a two-step reaction route, i.e., acid-base and fluorinating reactions, which also played an important role in accelerating the rate of conversion of chrysotile fibers into non-regulated materials, as compared to rate of conversion of chrysotile treated with $H_3PO_4$ acid alone. A decomposition pathway of chrysotile by HF could be stated as follows:

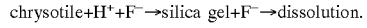

chrysotile+H$^+$+F$^-$→silica gel+F$^-$→dissolution.

The spectral feature of FIG. 5 also suggested that the concentration of acid in 1.5 M HF solution was not enough to hydrolyze completely the Mg(OH)$_2$ layers because of the presence of a weak peak at 3680 cm$^{-1}$, denoting a certain amount of non-reacted chrysotile remaining in the samples.

In contrast, when chrysotile was treated with 1.5 M FP(O)(OH)$_2$ a high rate of acid-base reaction was generated, corresponding to the elimination of Mg(OH)$_2$ layers. Additionally, the rates of chrysotile→silica gel→dissolution phase conversion, caused by the attack of (F$^-$) ions on the Mg(OH)$_2$-depleted silicious layers and silica gel by-products were also enhanced. The former phenomenon was evidenced by the lack of prominent peaks at 3680 and 610 cm$^{-1}$, belonging to the Mg(OH)$_2$ in the spectrum of this sample. The latter could account for a more pronounced leaching of silicate anions from chrysotile, as compared with leaching from the HF-treated chrysotile samples. In addition, this spectrum showed broad absorptions between 1120 cm$^{-1}$ and 970 cm$^{-1}$, containing at least five resolvable peaks at 1220, 1150, 1100, 1090, and 970 cm$^{-1}$.

Assuming that the bands at 1220, 1090, and 970 cm$^{-1}$ were due to the formation of silica gel and nonbridging oxygen of Si—O group, the other bands at 1150 and 1100 cm$^{-1}$ were more likely to be associated with ionic P—O stretching in the orthophosphate compounds as reaction products, rather than to those of Si— and F— related reaction products. However, it was uncertain whether these bands were associated with the tribasic (PO$_4^{3-}$), dibasic (HPO$_4^{2-}$), or monobasic (H$_2$PO$_4^-$) derivatives. Spectral features similar to those of 1.5 M FP(O)(OH)$_2$ were illustrated for the 2.0 M of FP(O)(OH)$_2$ as shown in FIG. 5. Again, it is believed that a two-step reaction route, acid-base and fluorinating reactions, occurring between chrysotile and FP(O)(OH)$_2$ was responsible for accelerating considerably the rate of chrysotile→non-regulated material conversion, thereby destroying the fibrous nature of the asbestos in a short time.

Figure 6:
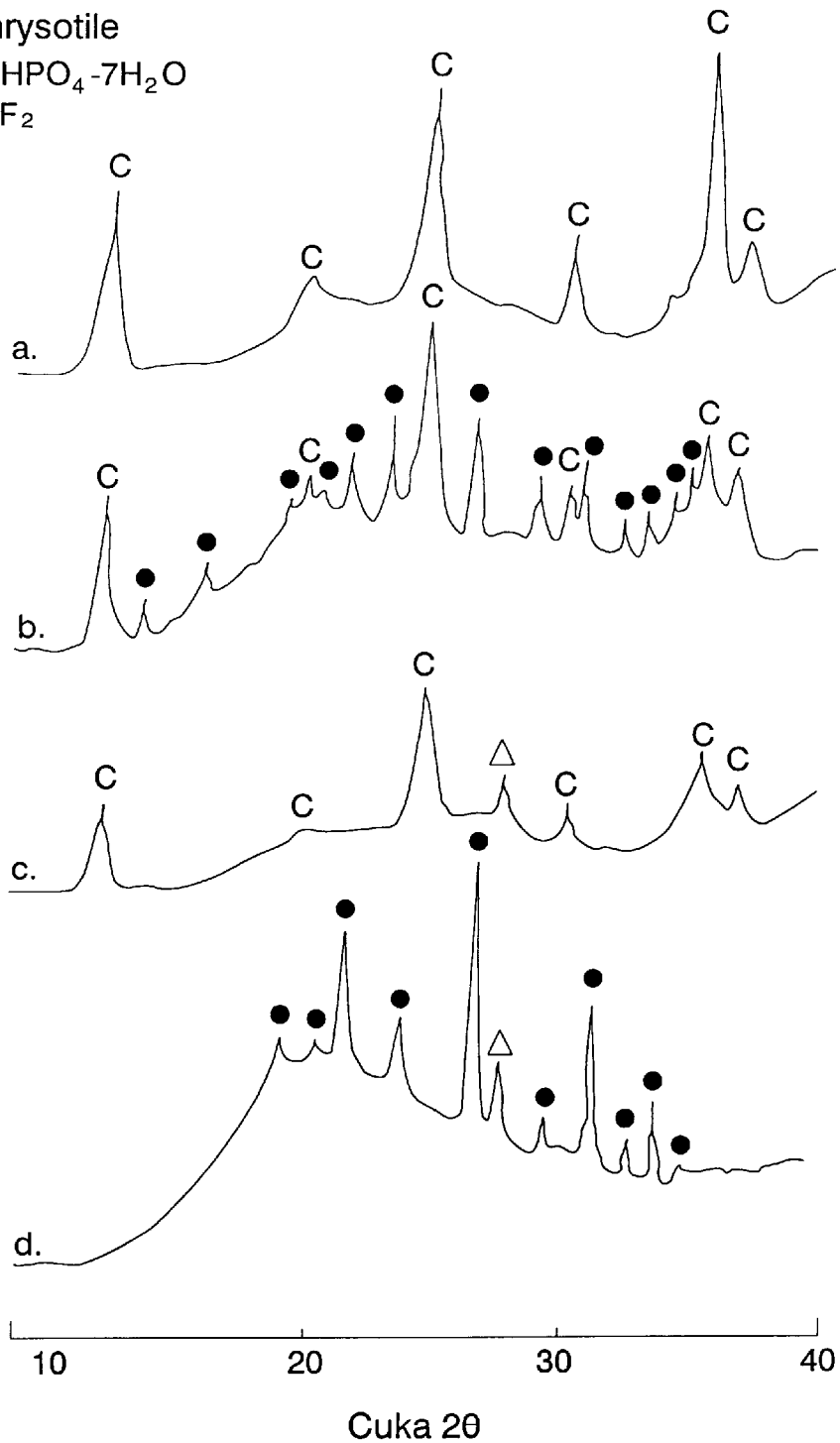
FIG. 6 shows XRD patterns of chrysotile asbestos samples treated with (a) 1.5 M $H_3PO_4$, (b) 1.5 M HF, and (c) 1.5 M $FP(O)(OH)_2$.

The results offered from the FT-IR study were confirmed by XRD tracings, from 0.11 to 0.23 nm. The same samples as those used in the FT-IR study were used as shown in FIG. 6. Using 1.5 M $H_3PO_4$ solution, the diffraction pattern (b) indicated the presence of magnesium hydrogen orthophosphate hydrate, MgHPO$_4$.7H$_2$O, as the crystalline reaction product, while retaining the strong chrysotile-related d-spacings. Correspondingly, it is believed that the ionic P—O stretching bands found in the FT-IR spectrum were due to the dibasic derivative (HPO$_4^{2-}$) in the MgHPO$_4$.7H$_2$O compound formed by the acid-base reaction between $H_3PO_4$ and the $Mg(OH)_2$ in chrysotile according to the following equation:

$$Mg(OH)_2 + H_3PO_4 \rightarrow MgHPO_4 + 2H_2O.$$

As seen from the XRD tracing 6 (c), 1.5 M HF precipitated a crystalline magnesium fluoride, $MgF_2$ (sellaite) phase as the reaction product, in conjunction with prominent lines of non-reacted chrysotile. Pattern (d) represents chrysotile treated with 1.5 M $FP(O)(OH)_2$. Pattern (d) is characterized by the inclusion of two crystalline reaction products, $MgHPO_4 \cdot 7H_2O$ and $MgF_2$, there were no clear d-spacings of chrysotile. Relating this finding to the FT-IR results, it appears that the reaction between chrysotile and 1.5M $FP(O)(OH)_2$ led to the precipitation of hybrid components containing amorphous silica gel, and crystalline $MgHPO_4 \cdot 7H_2O$ and $MgF_2$.

B. Amosite Asbestos

Figure 7:
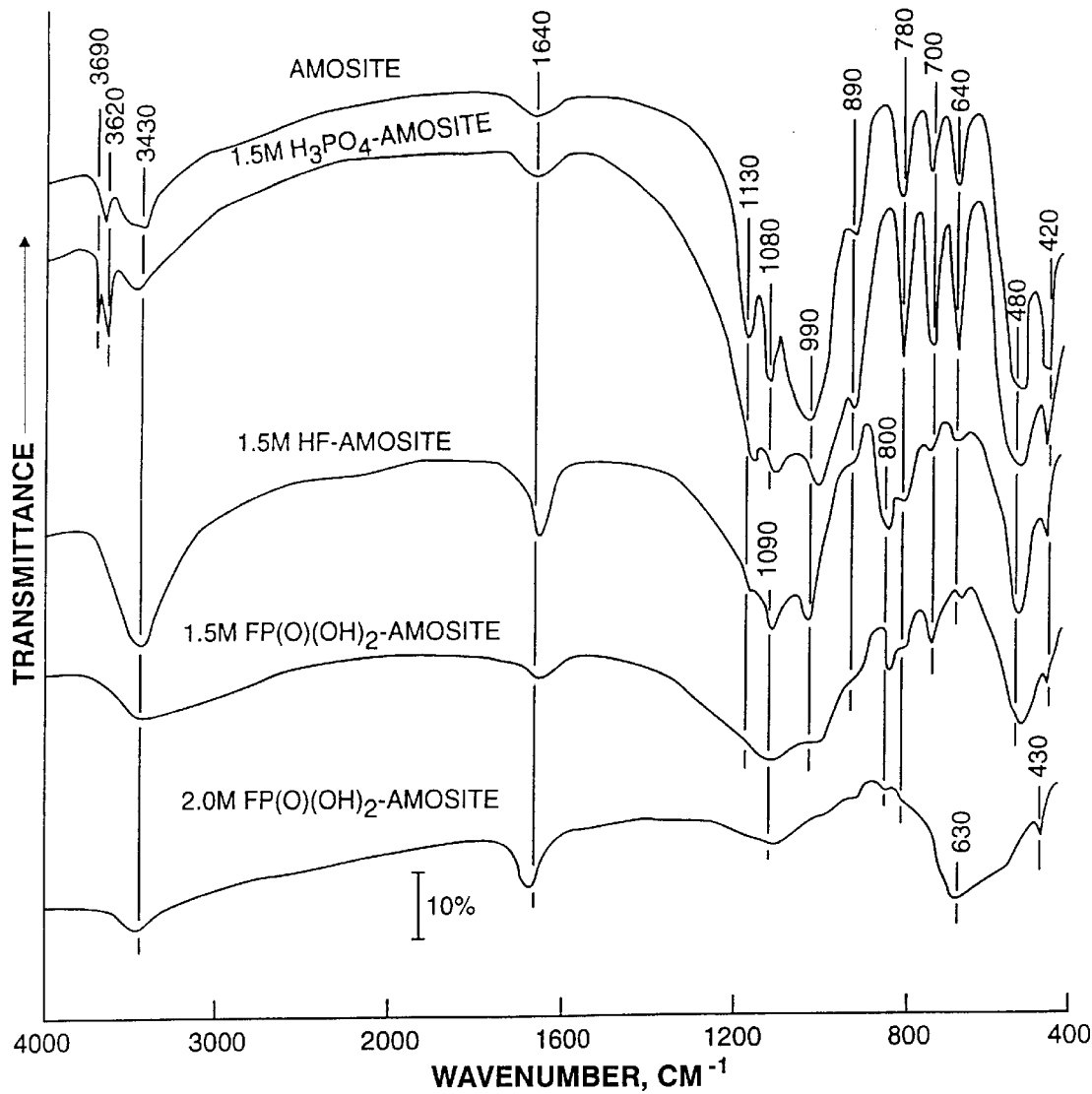
FIG. 7 is an FT-IR spectra for amosite fiber samples, untreated, and treated with 1.5 M $H_3PO_4$, 1.5 M HF, 1.5 M $FP(O)(OH)_2$ and 2.0 M $FP(O)(OH)_2$.

FIG. 7 shows the FT-IR spectra of amosite samples, untreated, and treated with 1.5 $MH_3PO_4$, 1.5 M HF, 1.5 M $FP(O)(OH)_2$, and 2.0 M $FP(O)(OR)_2$. The assignments of each absorption bands for untreated amosite fibers were as follows: bands at 3690 and 3620 $cm^{-1}$ were due to the H—O stretching vibration in Si—OH groups; bands at 3430 and 1640 $cm^{-1}$ were due to H—O stretching and bending vibrations of free or crystal water, respectively; the bands at 1130 $cm^{-1}$, and at 1080 $cm^{-1}$ were ascribed to the Si—O—Si antisymmetric stretching mode of bridging oxygens in the $SiO_4$ tetrahedra; the band at 990 $cm^{-1}$ corresponded to the Si—O stretching of nonbridging oxygens; the bands at 640 $cm^{-1}$ and 890 $cm^{-1}$, were related to both the H—O bending and Si—O stretching of SiOH groups; the band at 780 $cm^{-1}$ reflected Si—O—Si symmetric stretching of bridging oxygens between tetrahedra; and, the bands at 480 $cm^{-1}$ and 420 $cm^{-1}$ belonged to Si—O—Si and O—Si—O bending modes overlapping the stretching vibration of cation-oxygen bonds in the $R^{2+}O_6$ and $R^{3+}O_6$ octahedral layers. By comparison with the bands for untreated amosite, no particular changes in spectral feature could be seen on the 1.5 M $H_3PO_4$-treated amosite samples, all indicating that the amosite was unsusceptible to the reaction with 1.5 M $H_3PO_4$.

When the amosite fibers were immersed into a 1.5 M HF solution, there were two striking differences in spectral features; one was a considerable reduction of peak intensity at 3690, 3620, 1130, 1080, 890, 780, and 640 $cm^{-1}$, and the other was the appearance of a new absorption band at 1090 $cm^{-1}$ and sharp doublet peaks in the absorption range from 820 to 750 $cm^{-1}$. The former result represented the fact that the reaction between HF and amosite led to the breakage of Si—O bonds in Si—O—Si linkages and Si—OH groups. The contributors to this new intense absorption band and the newly developed doublet peaks were attributed to the formation of a quartz, $SiO_2$ phase as a reaction by-product. HF favorably reacted with the surface $SiO_4$ tetrahedra to precipitate the quartz. In fact, the strong bands at 480 and 420 $cm^{-1}$, originating from the cation-oxygen bonds, still remained in this spectrum. A further decrease in the intensity of the Si—O—Si— and Si—OH-related peaks was recognizable in the spectrum of 1.5 M $FP(O)(OH)_2$ treated amosite samples. As expected, the peaks at 1090, 800, and 780 $cm^{-1}$ indicated that quartz by-products precipitated into this sample. The data also demonstrated that the extent of intensity of the quartz-related peaks was somewhat lower than that of the HF-treated samples. A considerable lowering of these peaks was observed from 2.0 M $FP(O)(OH)_2$-treated samples, while the amosite-related peaks disappeared from the spectrum, instead of the growing of new bands at 630 and 430 $cm^{-1}$. This finding clearly verified that increasing the concentration of $FP(O)(OH)_2$ to 2.0M not only completely converted amosite into non-regulated materials, but also promoted the rate of dissolution of quartz by-products by the attack of $(F^-)$ ions. Thus, there was no visual observation of amosite fibers.

To identify the contributors to these new bands, we examined seven reference reaction products, $Fe_2O_3$, $Fe_3O_4$, FeO(OH), MnO, $MnO_2$, MgO, and $Mg(OH)_2$, as reference samples, by FT-IR. As a result, these peaks are more likely to be associated with the formation of manganese dioxide, $MnO_2$, rather than that of any other reference samples.

Although the role of acids released from 2.0 M $FP(O)(OH)_2$ in decomposing the amosite structure was not clear in this FT-IR study, it was clear that a large amount of $(F^-)$ ions played an essential role in increasing the rate of fluorinating reaction with the surface silicious layers, thereby enhancing the amosite→quartz phase conversion followed by the dissolution of quartz. It is believed that the damage of surface silicious layers by $(F^-)$ ions facilitated the penetration of $FP(O)(OH)_2$-released acids into the intermediate cation layers. Moreover, it was further believed that $H_3PO_4$ penetrated as acid reactant to react with $R^{2+}O_6$ and $R^{3+}O_6$ octahedra thereby generating an acid-base reaction. This reaction then led to the breakage of cation-oxygen bonds, thereby resulting in leaching of cations, Mg, Fe, and Mn, from the intermediate cation layers.

Figure 8:
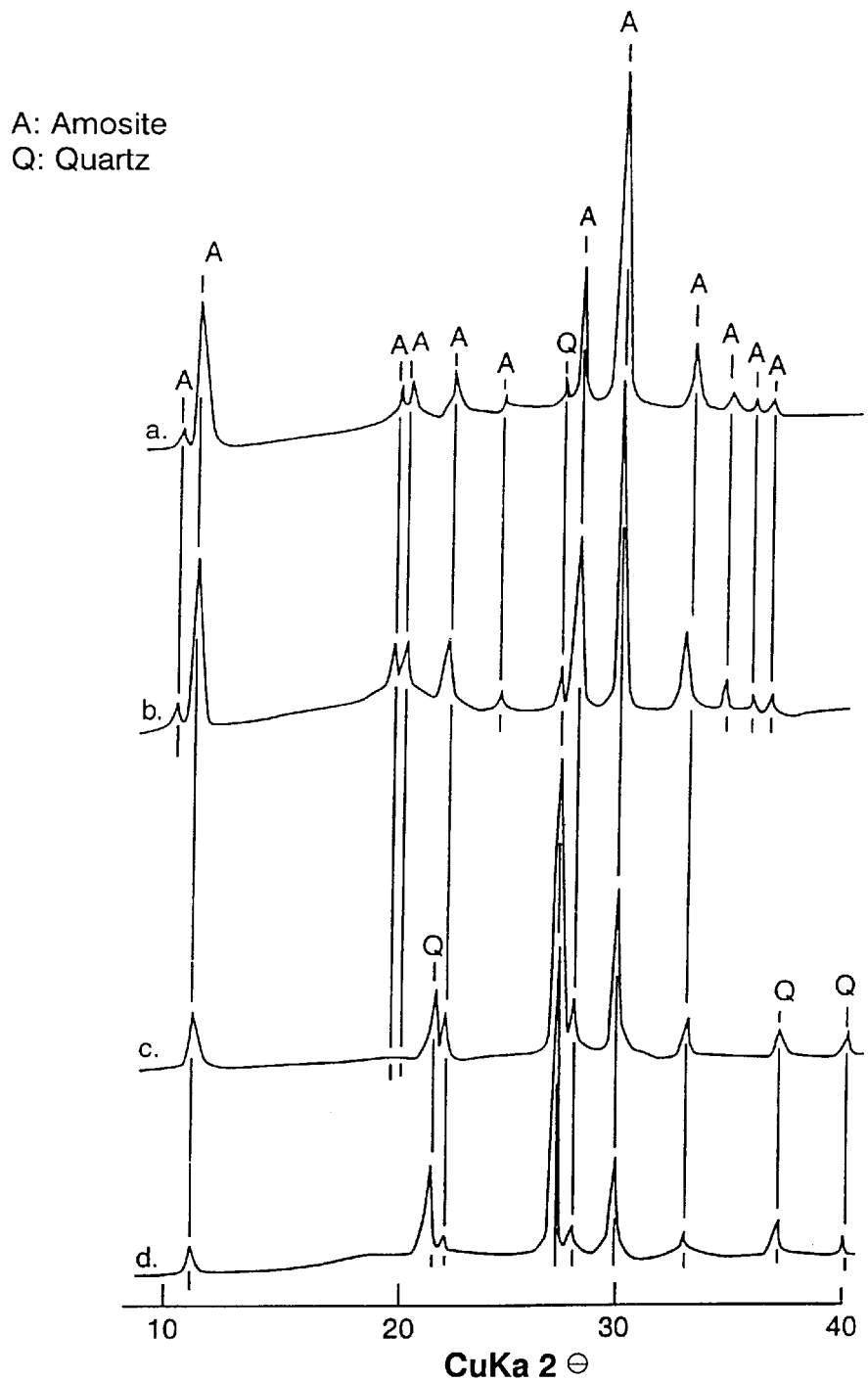
FIG. 8 shows XRD tracings of amosite fibers (a) untreated and treated with (b) 1.5 M $H_3PO_4$, (c) 1.5 M HF, and (d) 1.5 M $FP(O)(OH)_2$.

To support this information, the crystalline reaction products formed in the 1.5 M $H_3PO_4$, 1.5M HF, and 1.5M $FP(O)(OH)_2$-treated amosite were identified, by XRD. As illustrated in FIG. 8, XRD pattern (a) for the untreated amosite fibers showed that although the intensity of peak was weak, some quartz was present. No significant change in pattern feature was obtained from samples treated with $H_3PO_4$, as shown in XRD pattern (b). A further pronounced diminution of amosite-related line intensity together with the intense quartz lines was depicted in the $FP(O)(OH)_2$ samples (d), reflecting an increased rate of amosite→quartz phase conversion. The XRD pattern (not shown) of the 2.0 M $FP(O)(OH)_2$-treated samples had only a weak quartz line, while there were no amosite lines. Thus, the 2.0 M $FP(O)(OH)_2$ reagent not only completed the amosite→quartz phase conversion, but also promoted the dissolution of quartz.

C. Surface Chemistry of Conversion Products

The information described above provided the identification of conversion products which have a low solubility in water. However, water-soluble conversion products were not identified. The interactions occurring at interfaces between the chemical reagents as liquid phases, and the asbestos fibers as the solid phase were also studied. Water-insoluble and water-soluble reaction products and by-products were identified. The critical interfacial zone was explored using XPS. Internally generated $Mg_{2p}$, $Si_{2p}$, $C_{1s}$, $O_{1s}$, $F_{1s}$, $Fe_{2p3/2}$, $P_{2p}$, and $Mn_{2p3/2}$ peak areas were used to obtain atomic fractions, which were determined according to the equation:

$$C_x = I_x/S_x / \Sigma(L_i/S_i),$$

In this equation, $C_x$ is the concentration of a respective element X at the fiber's surface; $I_x$ is the peak area, defined by using the differential cross-sections for core-level excitation of element X; and $S_x$ is a sensitivity factor, i.e., 0.07, 0.17, 0.205, 0.63, 1.00, 3.80, 0.25 and 2.10 for Mg, Si, C, O, F, Fe, P, and Mn, respectively. The atomic composition expressed in percent of "as-received" chrysotile and amosite fiber surfaces was also used for comparison. The surface atomic fraction from these samples are given in Table 2 below:

TABLE 2

Atomic Composition of Untreated and 1.5 M $H_3PO_4$, HF, and $FP(O)(OH)_2$-Treated Chrysotile and Amosite Asbestos Surfaces

| Chemical reagent | Asbestos | Atomic composition, % | | | | | | | | Atomic ratio, | | |
|---|---|---|---|---|---|---|---|---|---|---|---|---|
| | | Mg | Si | Fe | C | O | P | F | Mn | Mg/Si | Fe/Si | Mn/Si |
| — | Chrysotile | 31.58 | 17.31 | — | 7.18 | 43.98 | — | — | — | 1.82 | 0.00 | 0.00 |
| $H_3PO_4$ | Chrysotile | 27.00 | 10.19 | — | 6.15 | 52.25 | 4.41 | — | — | 2.65 | 0.00 | 0.00 |
| HF | Chrysotile | 23.01 | 11.70 | — | 7.13 | 52.95 | — | 5.21 | — | 1.97 | 0.00 | 0.00 |
| $FP(O)(OH)_2$ | Chrysotile | 22.22 | 16.64 | — | 6.21 | 49.84 | 3.39 | 1.70 | — | 1.33 | 0.00 | 0.00 |
| — | Amosite | 1.24 | 21.62 | 4.10 | 18.98 | 53.85 | — | — | 0.21 | 0.06 | 0.19 | 0.01 |
| $H_3PO_4$ | Amosite | 1.08 | 21.41 | 3.85 | 10.90 | 58.96 | 3.81 | — | 0.20 | 0.05 | 0.18 | 0.01 |
| HF | Amosite | 0.38 | 19.43 | 2.00 | 10.04 | 59.41 | — | 8.65 | 0.09 | 0.02 | 0.10 | 0.01 |
| $FP(O)(OH)_2$ | Amosite | 0.10 | 15.99 | 1.51 | 11.05 | 64.56 | 4.18 | 2.61 | 0.00 | 0.01 | 0.09 | 0.00 |

The surface of "as-received" chrysotile had the Mg and O atoms as the most dominant elements, revealing the external $Mg(OH)_2$ layers, and the Si atom as a secondary element. Although some C contaminants were present at the outermost surface side, the atomic ratio of Mg/Si was 1.82. After dipping the chrysotile fiber disks in 1.5 M $H_3PO_4$, their surfaces exhibited a considerably higher Mg/Si ratio, compared with that of the untreated samples. This high ratio may be related to the migration of P and O atoms from the reagent to the fiber's surfaces, reflecting their coverage with a thick $MgHPO_4.7H_2O$ layers, as a reaction product. When the surface of chrysotile was treated with 1.5 M HF, more F and O atoms were incorporated into the surfaces of the fiber. The Mg/Si ratio was similar to that of the untreated chrysotile. In contrast, the lowest Mg/Si ratio was obtained from the surfaces of chrysotile fibers treated with 1.5 M $FP(O)(OH)_2$, suggesting that the top surface layers were occupied by an increased amount of Si-related reaction products and by-products.

With regard to the amo site fibers, the chemical composition of its surfaces consisted of three dominant elements, Si, C, and O. Mg, Fe, and Mn atoms were found as minor elements, in the Mg/Si, Fe/Si, and Mn/Si ratios of 0.06, 0.19, and 0.01, respectively. The source of Si and O atoms came from the outer silicious layers of amo site structure, while C was generated by organic carbonaceous impurities, such as amino-acids and hydrocarbons. These minor elements might be associated with the intermediate oxygen-coordinated cation species present beneath the $SiO_4$, tetrahedral layers. Treating amosite with 1.5 M $H_3PO_4$ resulted in the migration of 3.81% P atoms from the solution to the surfaces of the fiber. By comparison with that of untreated amosite, the quantities of all the elements, excepting the O atom, slightly decreased because of the coverage of P and O atom-related chemical compounds over the surfaces of the amosite fiber.

The identification of these compounds was later carried out by inspecting the high-resolution $P_{1s}$ core-level spectrum. However, the atomic ratios of Mg/Si, Fe/Si, and Mn/Si were almost the same as those of untreated amosite surfaces, indicating that there were no major changes in surface elemental components of $H_3PO_4$-treated amosite. In other words, the surfaces of amosite have a low reactivity with $H_3PO_4$. With 1.5 M HF, the decrease in the Mg/Si and Fe/Si ratios indicated that more Si atoms occupied the superficial layers of amosite fiber as shown in Table 2.

The incorporation of 8.65% F atoms and an additional O atom into the surface layers indicated that the reaction at interfaces between HF and amosite could precipitate SiF-containing compounds and $SiO_2$. The surfaces of 1.5 M $FP(O)(OH)_2$-treated amosite exhibited the lowest amount of the cation species, especially of Mn atom; namely, there was a further decrease in the Mg/Si, Fe/Si, and Mn/Si ratios, while additional O, P, and F atoms migrated from the $FP(O)(OH)_2$ solution to the surfaces of the amosite fiber. Thus, $FP(O)(OH)_2$ had a strong affinity for the amosite surfaces evidenced by extensive deposits of Si-related conversion products.

To identify the conversion products formed at the interface between asbestos and $FP(O)(OH)_2$, HF, and $H_3PO_4$ solutions, and also to understand better the chemical states of the surface, we inspected the high-resolution $Mg_{2p}$, $Si_{2p}$, $P_{2p}$, $F_{1s}$, $Fe_{2p3/2}$, and $Mn_{2p3/2}$ core-level spectra for chrysotile and amosite disks treated with $FP(O)(OH)_2$, HF, and $H_3PO_4$ solutions at 1.5 M. For all the XPS core-level spectra, the scale of the binding energy (BE) was calibrated with the $C_{1s}$ of the principal hydrocarbon-type carbon peak fixed at 285.0 eV as an internal reference standard. A curve-deconvolution technique using a Du Pont curve resolver was employed to substantiate the information on the respective chemical states from the high-resolution spectrum of each element.

Figure 9:
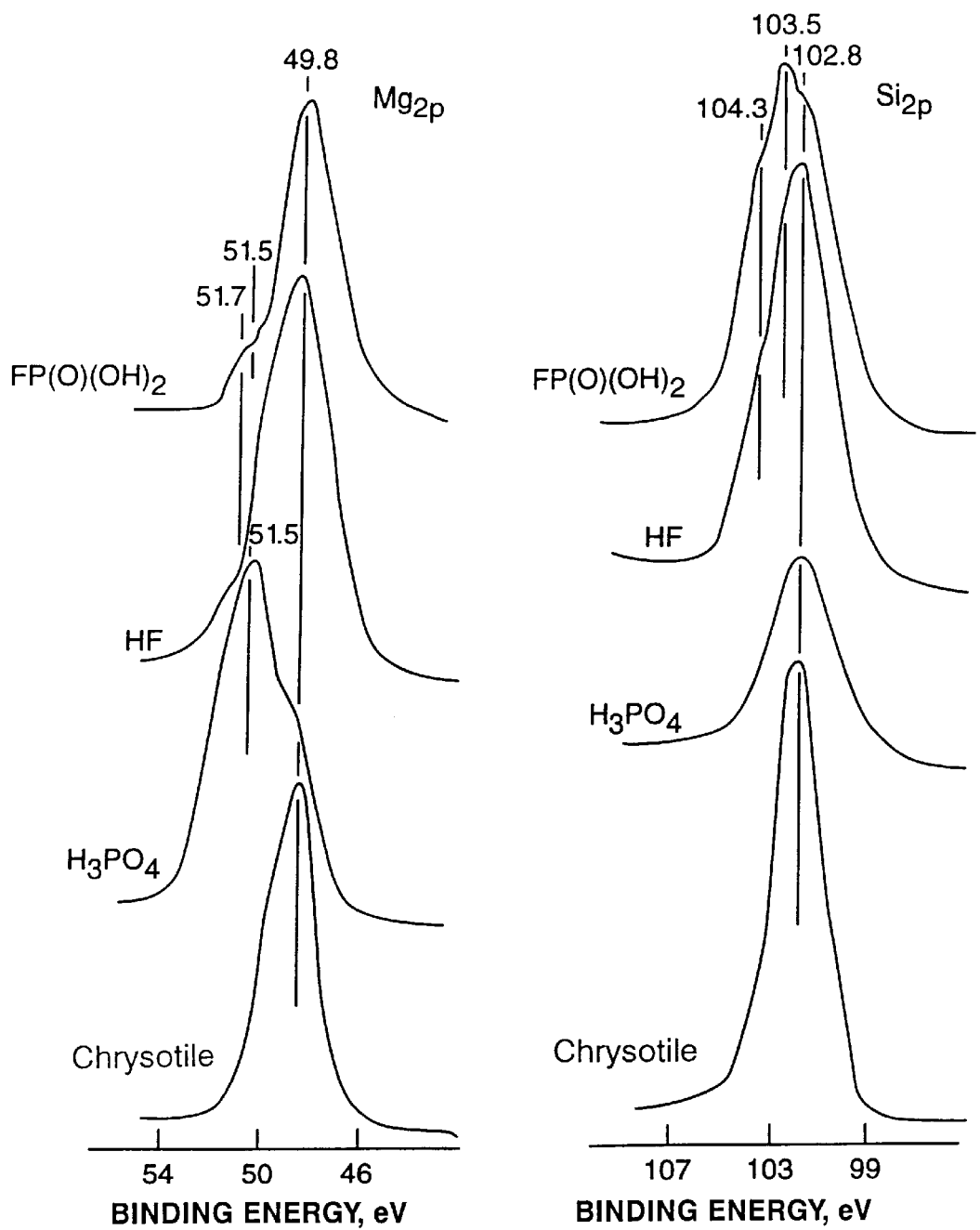
FIG. 9 illustrates XPS $Mg_{2p}$ and $Si_{2p}$ core-level spectra for surfaces of chrysotile fiber untreated, and treated with 1.5 M $H_3PO_4$, 1.5 M HF, and 1.5 M $FP(O)(OH)_2$.

FIG. 9 illustrates $Mg_{2p}$ and $Si_{2p}$ core-level spectra chemically treated fiber surfaces of chrysotile. The $Mg_{2p}$ region of chrysotile revealed only a single symmetric peak at 49.8 eV, belonging to Mg in chrysotile, $Mg_{g3}(Si_2O_5)(OH)_4$. In contrast, a striking change in the feature of the $Mg_{2p}$ signal was observed from the $H_3PO_4$-treated samples; in particular, a new principal signal had emerged at the BE position of 51.5 eV which could have originated from Mg in the magnesium orthophosphate compounds, while the signal at 49.8 eV, corresponding to the Mg in chrysotile had became the shoulder peak, reflecting minor changes in the chemical state. Relating this finding to the FT-IR and XRD results, the orthophosphate compound reflected the formation of $MgHPO_4.7H_2O$ as a reaction product. Without being bound by theory, it is believed that $MgHPO_4.7H_2O$ precipitated on chrysotile was the reason why such a high Mg/Si ratio together with a certain amount of P were obtained from the chrysotile sample surfaces treated with $H_3PO_4$.

The $Mg_{2p}$ spectrum of HF-treated samples displayed a feature which could be resolved into two Gaussian components: at 49.8 eV as the major peak and at 51.7 eV as the minor one. The latter peak could be assignable to Mg in $MgF_2$, and the former peak was due to Mg in chrysotile. As expected, the $Mg_{2p}$ region of $FP(O)(OH)_2$ samples included the two reaction products, $MgHPO_4.7H_2O$ and $MgF_2$, corresponding to the peaks at 51.7 and 51.5 eV, and the unreacted chrysotile at 49.8 eV as the main component. The $Si_{2p}$ spectra provided additional information on interfacial reaction products. For the surfaces of $H_3PO_4$ samples, the spectral feature of the $Si_{2p}$ region closely resembled that of the untreated chrysotile which had only a single peak at 102.8 eV, revealing Si in the chrysotile. Thus, there were no reaction products related to the $SiO_2$—$P_2O_5$ systems.

When the chrysotile sample was treated with HF, two additional shoulder peaks at 103.5 and 104.3 eV evolved in the spectrum containing a major peak at 102.8 eV. Based on published data, the peaks at 103.5 and 104.3 eV could be assigned to the Si in $SiO_2$ gel and in fluorosilicic acid ($H_2SiF_6$), respectively. Because $H_2SiF_6$ is soluble in water, it could not be identified it in FT-IR and XRD studies which were conducted on samples washed with deionized water. By comparison with a sample of HF treated chrysotile, the major characteristic of spectral feature for the $FP(O)(OH)_2$-treated samples was that the $SiO_2$ gel-related shoulder peak at 103.5 eV became the principal one, reflecting a heavy coverage of $SiO_2$ gel over the chrysotile surfaces.

Figure 10:
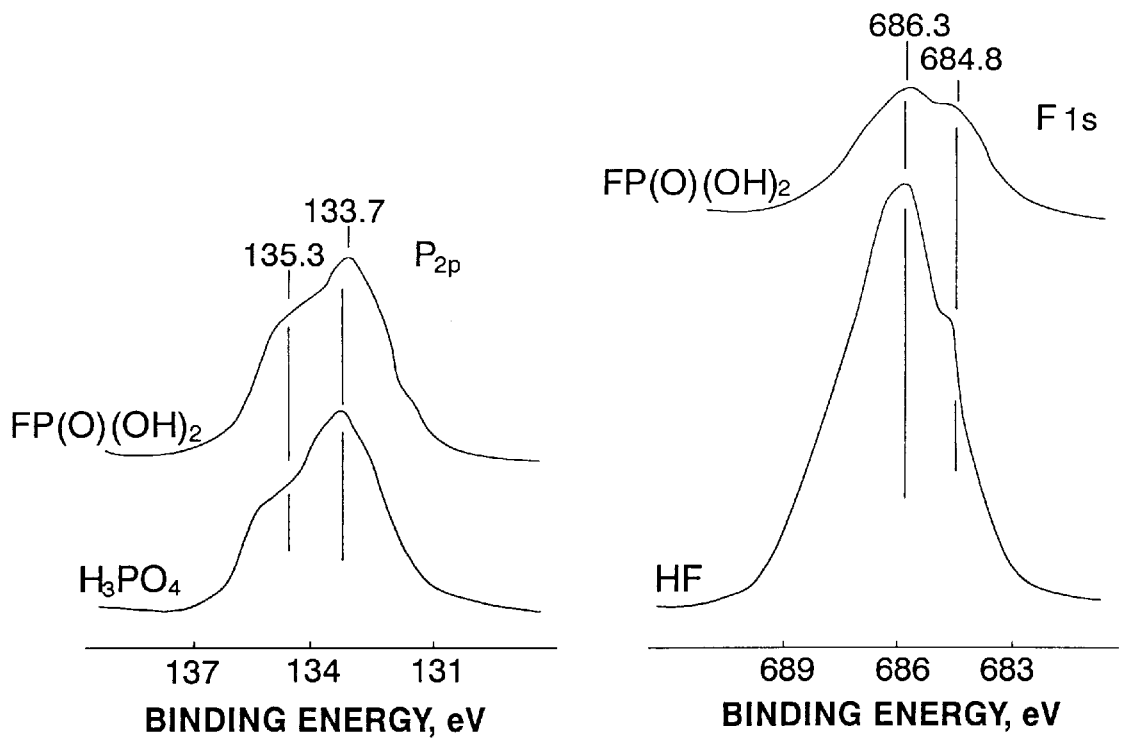
FIG. 10 shows XPS $P_{2p}$ and $F_{1s}$ regions for surfaces of chrysotile fiber treated with 1.5 M $H_3PO_4$, 1.5 M HF and 1.5 M $FP(O)(OH)_2$.

The presence of these reaction products and by-products identified in $Mg_{2p}$ and $Si_{2p}$ regions were supported by inspecting the $P_{2p}$ and $F_{1s}$ spectra of chrysotile surfaces treated with 1.5 M $H3PO_4$, HF, and $FP(O)(OH)_2$. As shown in FIG. 10, in the $P_{2p}$ region, a similar feature in the curves could be seen in the both the $H_3PO_4$- and $FP(O)(OH)_2$-treated surfaces of chrysotile fiber; they had two resolvable peaks, at 133.7 eV, originating from the P in $MgHPO_4.7H_2O$ as the major orthophosphate-related reaction product, and at 135.3 eV, which corresponded to the P in phosphorous pentoxide, $P_2O_5$. In the $F_{1s}$ region of $FP(O)(OH)_2$ and HF samples, as shown in FIG. 10, two F-related reaction products, $H_2SiF_6$ and $MgF_2$, were identical as indicated by the emergence of two peaks, at 686.3 eV as the main component, and at 684.8 eV as the minor one. From the XPS study described above, the two-step reaction route, acid-base and fluorinating reactions at interfaces between $FP(O)(OH)_2$ solution and chrysotile fibers could account for the precipitation of four possible conversion products, $SiO_2$ gel, $H_2SiF_6$, $MgHPO_4.7H_2O$, and $MgF_2$, all environmentally benign non-regulated components.

Figure 11:
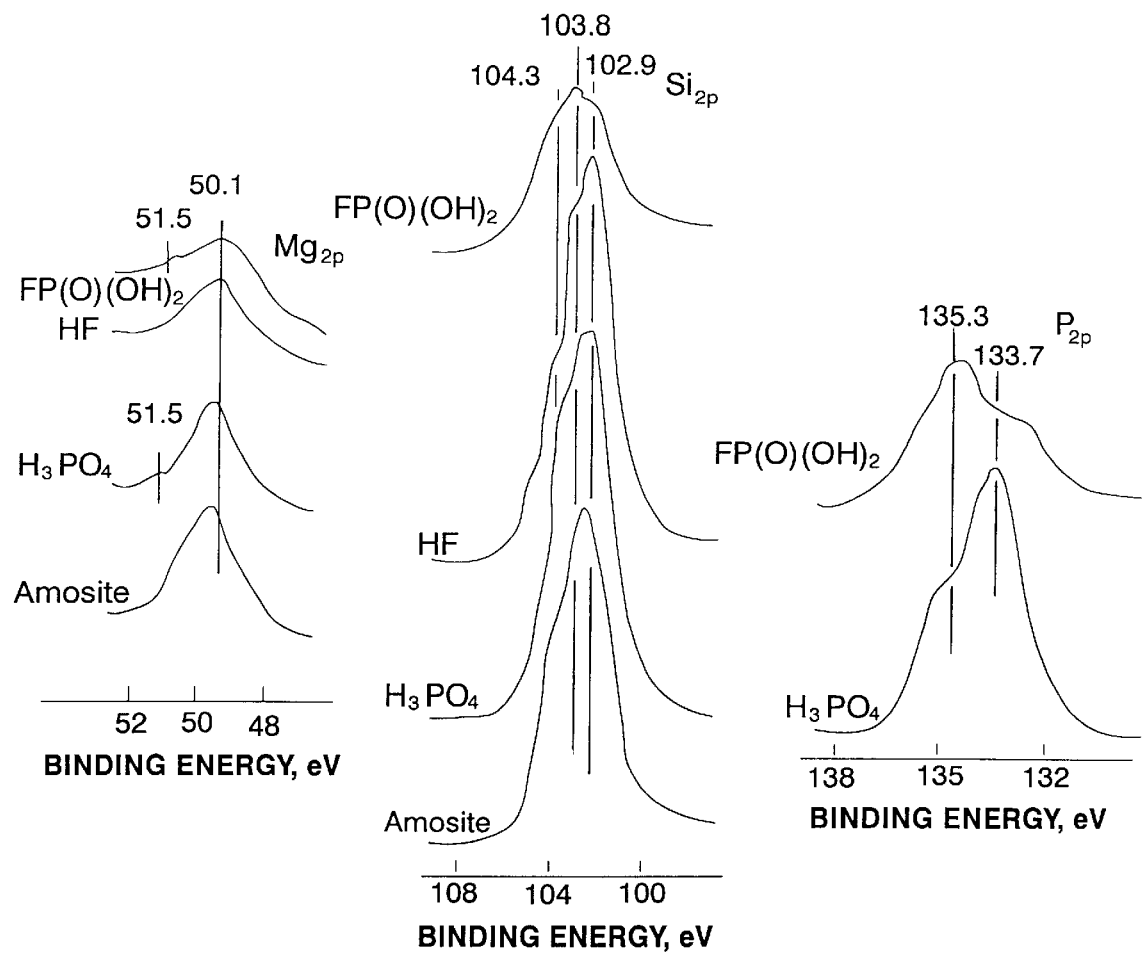
FIG. 11 illustrates XPS spectra of $Mg_{2p}$, $Si_{2p}$, and $P_{2p}$ regions for surfaces of amosite fiber untreated, and treated with 1.5 M $H_3PO_4$, 1.5 M HF, and 1.5 M $FP(O)(OH)_2$.

Next, the contributors to the peaks emerging in the $Mg_{2p}$, $Si_{2p}$, $P_{2p}$, $F_{1s}$, $Fe_{2p3/2}$, and $Mn_{2p3/2}$ regions were investigated with respect to amosite fibers treated with 1.5 M $FP(O)(OH)_2$, HF, and $H_3PO_4$. The resulting spectra in the $Mg_{2p}$, $Si_{2p}$, and $P_{2p}$ regions are illustrated in FIG. 11. In the $Mg_{2p}$ region, although the signal intensity of the overall spectrum is weak, the untreated amosite exhibited a single peak at 50.1 eV, indicating the presence of Mg of the $Mg^{2+}$—O bond in the intermediate cation layers. Treating amosite with $H_3PO_4$ caused the development of an additional shoulder peak at 51.5 eV. In the $Mg_{2p}$ spectrum of $H_3PO_4$-treated chrysotile, the contributor to the peak at 51.5 eV was assigned to the Mg in dibasic orthophosphate derivatives. Thus, it was inferred that a possible acid-base reaction between $H_3PO_4$ and oxygen-coordinated $Mg^{2+}$ also precipitates $MgHPO_4$ compounds. The spectral features of HF-treated amosite closely resembled that of untreated amosite, suggesting that there is no precipitation of the magnesium fluoride-related reaction products. Although the signal intensity of overall spectrum was very weak, the $FP(O)(OH)_2$ sample surfaces had two signals at 50.1 and 51.5 eV, revealing oxygen-coordinated $Mg^{2+}$ as the major component, and the $MgHPO_4$ reaction products as a secondary component.

In the $Si_{2p}$ region, the spectrum of amosite fibers demonstrated two Si-related components. The major component of silica in silicious layers was reflected in the principal line at 102.9 eV, while Si in quartz was present as a minor component at 103.8 eV. A similar spectral curve was obtained from the $H_3PO_4$-treated amosite surfaces, supporting the fact that the $SiO_4$ tetrahedra of amosite surfaces were unreactive to $H_3PO_4$. An additional signal as a weak shoulder peak at 104.3 eV was incorporated into this spectrum when the amosite was treated with HF. This weak signal was attributable to the Si in $H_2SiF_6$. Also, this spectrum showed the growth of quartz-related signal at 103.8 eV, indicating that the interaction between HF and amosite contributes to forming quartz-enriched top surface layers. The spectral features of $FP(O)(OH)_2$-treated samples differed from those of other spectra of amosite. A different feature was that quartz- and $H_2SiF_6$-related peaks at 103.8 and 104.3 eV became the major and secondary signals, respectively, while the intensity of the amosite Si peak at 102.9 eV had considerably decayed. Thus, $FP(O)(OH)_2$ had a strong affinity for the $SiO_4$ tetrahedral layers in amosite, to form quartz as the major reaction by-product, and $H_2SiF_6$ as the secondary reaction product.

Figure 12:
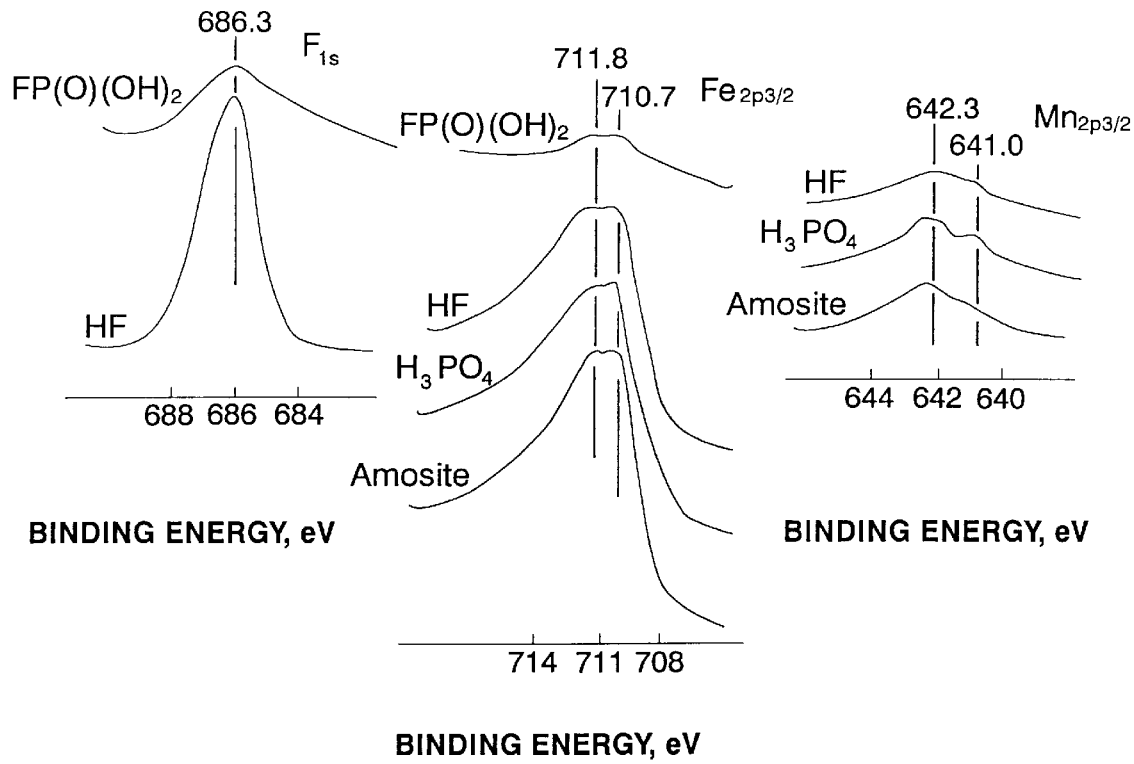
FIG. 12 shows XPS $F_{1s}$, $Fe_{2p3/2}$ and $Mn_{2p3/2}$ core-level spectra for surfaces of amosite untreated, and treated with 1.5 M $H_3PO_4$, 1.5 M HF, and 1.5 M $FP(O)(OH)_2$.

In the $P_{2p}$ region, the spectra for the $FP(O)(OH)_2$— and $H_3PO_4$-treated samples could be accounted for the precipitation of two P-related compounds, $MgHPO_4$ at 133.7 eV and $P_2O_5$ at 135.3 eV. $H_3PO_4$ treatment favorably formed $MgHPO_4$ compounds, as shown by the prominent peak at 133.7 eV. This information was supported by inspecting the spectra excited in the $F_{1s}$, $Fe_{2p3/2}$, and $Mn_{2p3/2}$ regions as shown in FIG. 12. Regardless of the fact that the signal intensity of the overall spectrum depended on the particular chemical reagent, only one signal at 686.3 eV, corresponding to $H_2SiF_6$, was apparent in the $F_{1s}$ region of the $FP(O)(OH)_2$ and HF samples. In the $Fe_{2p3/2}$ region, all the untreated and treated amosite samples showed a spectra containing two distinct peaks separated by 1.1 eV. These peaks originated from the Fe in the oxygen-coordinated Fe ion species in the cation layers. The spectra of untreated, and HF- and $H_3PO_4$-treated amosite samples exhibited two peaks at 642.4 and at 641.0 eV, the former peak as main component was assigned to Mn of oxygen-coordinated Mn ions present in cation layers, and the latter was assigned to Mn in MnO. Based on this assignment, amosite contained a certain amount of $MnO_2$. No Fe and Mn-related reaction products were found.

Accordingly, the reasons for the significantly pronounced leaching of Mg, Fe, and Mn ionic species by FP(O)(OH) was interpreted as follows. In the first reaction step, the fluorinating activity of F ions from $FP(O)(OH)_2$ present on the surface silicious layers contributed to disintegrating the $SiO_4$ tetrahedra structure. Once the outer layer had broken, $FP(O)(OH)_2$-induced acids readily diffused into the intermediate cation layers, and then reacted with the oxygen-coordinated Mg, Fe, and Mn ionic species to break Mg—O, Fe—O, and Mn—O bonds. Such bond breakages by acid-base reactions not only brought about the hydrolysis of the $R^{2+}O_6$ and $R^{3+}O_6$ octahedral structure, but also afforded the precipitation of $MgHPO_4$ reaction products.

D. Discussion of Experimental Results

When two different asbestos, chrysotile with a serpentine structure and amosite with an amphibole structure, came in contact with 1.5 M $FP(O)(OH)_2$ solution, the ΔH generated from conversion of chrysotile was much higher than that from conversion of amosite. Hence, the amphibole structure had less susceptibility to reaction with $FP(O)(OH)_2$, than the serpentine structure of chrysotile. Increasing the concentration of $FP(O)(OH)_2$ to 2.0 M generated a considerably high ΔH, and also served to leach a large amount of ionic species, reflecting the complete conversion of both chrysotile and amosite fibers into non-regulated environmentally benign materials.

Based on the equilibrium relation of $FP(O)(OH)_2$ in aqueous medium, represented as $FP(O)(OH)_2+H_2O=HF+$ $H_3PO_4$, reaction mechanisms and decomposition pathways of chrysotile fibers by $FP(O)(OH)_2$ according to the present invention are shown in FIG. 1. In the first stage of decomposition, the acid-base reaction between $H_3PO_4$ derived from $FP(O)(OH)_2$ and external $Mg(OH)_2$ layers of chrysotile precipitated crystalline $MgUPO_4.7H_2O$ as a reaction product, and also lixiviated Mg ions from the chrysotile, thereby removing the $Mg(OH)_2$ layers. The fluorinating activity of HF from $FP(O)(OH)_2$ on the inner silicious layers and lixiviated Mg ions, in the second stage of decomposition, served to precipitate three conversion products, $MgF_2$, $H_2SiF_6$, and $SiO_2$ gel. Further, attack of extra HF on $SiO_2$ gel caused its dissolution. Nevertheless, we believe that the two-step reaction route, acid-base and fluorinating reactions, contributed significantly to promote the conversion of chrysotile fibers into non-regulated materials. In contrast, tetrahedral chains that sandwich a layer of edge-shared $R^{2+}O_6$ and $R^{3+}O_6$ octahedra found in amosite were quite different from that of chrysotile because of the presence of silicate oxygen-enriched surfaces which had a low susceptibility to reaction with acid. Thus, the silicate tetrahedra as top surface layers preferentially reacted with HF, rather than that with $H_3PO_4$ as shown in FIG. 2 above. This fluorinating reaction triggered the formation of quartz and $H_2SiF_6$ as conversion products. The quartz was finally dissolved by further attack of HF, thereby resulting in leaching of a large amount of silicate anions. Once the silicious layers were eliminated, the $H_3PO_4$ solution readily diffused into the $R^{2+}O_6$ and $R^{3+}O_6$ octahedra as the intermediate cation layers to react with oxygen-coordinated Mg, Fe, and Mn ionic species. Such an acid-base reaction not only led to the breakage of $R^{2+}$— and $R^{3+}$—O bonds, thereby lixiviating the ionic species, such as Mg, Fe, and Mn, but also precipitated $MgHPO_4$ as a reaction product.

The examples above also reveal that amosite can be selectively converted to quartz at a low temperature and low pressure, as shown in FIG. 8. The selection of the chemical reagent system and the concentration of the system used will affect the selective conversion to quartz. Treatment of amosite with 1.5M $FP(O)(OH)_2$ or a mixture of 1.5M HF and 1.5M $H_3PO_4$ will achieve a relatively high conversion to quartz. Increasing the concentration of $FP(O)(OH)_2$ to a 2.0M solution will reduce the conversion of amosite to quartz and instead increase conversion to silica.

Example 5

In tests conducted on asbestos-containing materials deposited on metal substrates, using fluoro acid conversion reagents, such as HF, significant corrosion of the carbon steel metal substrates were observed. Accordingly, reagents capable of converting an asbestos-containing material and inhibiting corrosion of a metal substrate were investigated.

An asbestos-containing slurry consisting of chrysotile fibers, gypsum and water was deposited on the surfaces of eight 4 inch×4 inch carbon steel plates, using plastic molds to contain the slurry. The deposited slurry was allowed to dry at approximately 25° C. for three weeks, resulting in an asbestos-containing composite, consisting of approximately 30 volume percent chrysotile and 70 volume percent gypsum, adhered to the surface of each of the carbon steel plates. Plastic tubes were inserted into the asbestos-containing composite layers for use as conduits for reagents to completely wet the surface of the carbon steel plates.

The eight test plates were treated, repectively, by pouring the following reagents into the plastic tubes: (1) 2.0M hydroflouric acid (HF); (2) 2.0M fluorophosphoric acid (FPA); (3) 2.0M triethylamine tris (hydrogen fluoride) (TATF); (4) 2.0M hydrogen fluoride-pyridine (HFP); (5) 2.0M poly [4-vinylpyridinium poly (hydrogen fluoride)] (PVPF); (6) equal amounts by weight of 2.0M FPA and 2.0M TATF; (7) equal amounts by weight of 2.0M FPA and 2.0M HFP; and (8) equal amounts by weight of 2.0M FPA and 2.0M PVPF, in amounts sufficient to wet the surface of each of the steel plates.

The treated plates were left overnight (approximately 12 to 14 hours) at room temperature, then cross-sections were taken of each of the treated plates and the cross-sections were visually inspected for the presence of oxidation (or rust) on the treated surface of each of the steel plates.

The results from the above example are summarized in Table 3 below.

TABLE 3

Results of Corrosion Evaluation of Treated Asbestos on a Carbon Steel Substrate

| Chemical Reagent | Oxidation (or Rust) observed: | | | |
|---|---|---|---|---|
| | Heavy | Moderate | Light | None |
| 2.0M HF | X | | | |
| 2.0M FPA | | | X | |
| 2.0M TATF | | | X | |
| 2.0M HFP | | | X | |
| 2.0M PVPF | | | X | |
| 2.0M FPA/ 2.0M TATF | | | | X |
| 2.0M FPA/ 2.0M HFP | | | | X |
| 2.0M FPA/ 2.0M PVPF | | | | X |

Table 3 shows the results of the visual inspection of the steel surface of the cross sections taken from each of the samples. The steel surface of the sample treated with 2.0M HF appeared reddish-orange over the entire surface, indicating heavy oxidation of the steel. The steel surface of the samples treated with 2.0M FPA, 2.0M TATF, 2.0M HFP and 2.0M PVPF, respectively, appeared to have local areas with a faint reddish-orange color, indicated some light oxidation. The steel surfaces of the samples treated with the combinations 2.0M FPA/2.0M TATF, 2.0M FPA/2.0M HFP and 2.0M FPA/2.0M PVPF, respectively, appeared to be free of any oxidation.

Although asbestos treated with a conversion reagent, such as HY, may be substantially converted to a benign material, it is apparent that merely using a converting reagent will corrode a steel substrate. By using reagents with both a converting component and a corrosion inhibiting component it is possible to substantially convert the asbestos material to a benign material, while significantly inhibiting corrosion of a steel substrate. Moreover, by using combinations of different reagents, with each reagent containing both a converting component and a corrosion inhibiting component, it is possible to substantially convert an asbestos material to a benign material and to further inhibit corrosion of a steel substrate.

Thus, while there have been described what is presently believed to be the preferred embodiments of the present invention, those skilled in the art will appreciate that other and further changes and modification can be made without departing from the scope or spirit of the invention, and it is intended to include all such other changes and modifications as being within the scope of the invention as described in the appended claims.

What we claim is:

1. A method for converting asbestos-containing maerial covering a metal surface into a non-regulated material and imhibiding corrosion of the metal surface, said method comprising contacting the asbestos-containing material with a composition which comprises a combination of at least two multiple-functional group reagents, in which each reagent comprises a fluoro acid component and a corrosion inhibiting component, said corrosion inhibiting component comprising a functional group selected from the group consisting of a phosphate, aliphatic amine, aromatic amine and a poly aromatic amine, wherein the asbestos is converted to a non-regulated material and corrosion of the metal substrate is inhibited.

2. The method of claim 1, wherein said asbestos-containing material is selected from the group consisting of amosite-containing material, chrysotile-containing material and mixtures thereof.

3. The method of claim 2, wherein said non-regulated material includes silica gel.

4. The method of claim 1, wherein said asbestos-containing material comprises amosite.

5. The method of claim 4, wherein said non-regulated material includes quartz.

6. The method of claim 1, wherein said composition comprises an admixture of a first multiple-functional group reagent, consisting of fluorophoschoric acid, and at least one multiple-functional group reagent selected from the group consisting of triethylamine tris (hydrogen fluoride), hydrogen fluoride-pyridine and poly.

7. The method of claim 6, wherein each of said multiple-functional group reagents is in a concentration from about 0.5M to about 6.0M.

8. The method of claim 6, wherein said admixunre is prepared by mixing a first multiple-functional group reagent, consisting of from about 0.5M to about 3.0M fluorophosphoric acid, with a second multiple-functional group reagent selected from the group consisting of from about 0.5M to about 2.0M triethylamine tris (hydrogen fluoride), from about 0.5M to about 2.0M hydrogen fluoride-pyddine and from about 0.5M to about 2.0M ploy.

9. The method of claim 8, wherein said admixture is prepared by mixing equal amounts by weight of said first multiple-functional group reagent and said second multiple-funtional group reagent.

10. A composition for convening asbestos-containing material covering a metal surface into a non-regulated material and inhibiting corrosion of the metal surface, said compositon comprising a combination of at least two multiple-functional group reagents, in which each reagent comprises a fluoro acid component and a corrosion inhibiting component, said corrosion inhibiting component comprising a functional group selected from the group consisting of a phosphate, aliphatic amine, aromatic and a poly aromatic amine.

11. The composition of claim 10, wherein said asbestos-containing material is selected from the group consisting of amosite-containing material, chrysotile-containing material and mixtures thereof.

12. The composition of claim 11, wherein said non-regulated material includes silica.

13. The composition of claim 10, wherein said asbestos-containing material comprises amosite.

14. The composition of claim 13, wherein said non-regulated material includes quartz.

15. The composition of claim 10, wherein said composition comprises an admixture of a first multple-functional group reagent, consisting of fluorophosphoric acid, and at least one multiple-functional group reagent selected from the group consistig of trietylamine tris (hydrogen fluoride), hydrogen fluoride-pyridine and poly.

16. The composition of claim 15, wherein each of said multiple-functional group reagents is in a concentration from about 0.5M to about 6.0M.

17. The composition of claim 15, wherein said admixture is preared by mixing a first multiple-functional group reagent, consisting of from about 0.5M to about 3.0M fluorophosphoric acid, with a second multiple-functional group reagents is in a concentration from about 0.5M to about 2.0M triethylamine tris (hydrogen fluoride), from about 0.5M to about 2.0M hydrogen fluorlde-pyridine and from about 0.5M to about 2.0M poly.

18. The composition of claim 17, wherein said admixture is prepared by mixing equal amounts by weight of said first multiple-functional group reagent and said second multiple-functional group reagent.

* * * * *